United States Patent
Deng et al.

(10) Patent No.: US 12,009,480 B2
(45) Date of Patent: Jun. 11, 2024

(54) METAL-SULFUR BATTERY

(71) Applicant: SHENZHEN CAPCHEM TECHNOLOGY CO., LTD., Guangdong (CN)

(72) Inventors: Yonghong Deng, Guangdong (CN); Bing Han, Guangdong (CN); Yinglin Xiao, Guangdong (CN)

(73) Assignee: SHENZHEN CAPCHEM TECHNOLOGY CO., LTD., Shenzhen (CN)

( * ) Notice: Subject to any disclaimer, the term of this patent is extended or adjusted under 35 U.S.C. 154(b) by 579 days.

(21) Appl. No.: 17/281,280

(22) PCT Filed: Sep. 29, 2019

(86) PCT No.: PCT/CN2019/108833
§ 371 (c)(1),
(2) Date: Mar. 30, 2021

(87) PCT Pub. No.: WO2020/063938
PCT Pub. Date: Apr. 2, 2020

(65) Prior Publication Data
US 2022/0006123 A1 Jan. 6, 2022

(30) Foreign Application Priority Data
Sep. 30, 2018 (CN) .......................... 201811158211.2
Sep. 30, 2018 (CN) .......................... 201811159714.1

(51) Int. Cl.
*H01M 10/0568* (2010.01)
*H01M 4/36* (2006.01)
(Continued)

(52) U.S. Cl.
CPC ....... *H01M 10/0568* (2013.01); *H01M 4/364* (2013.01); *H01M 4/381* (2013.01);
(Continued)

(58) Field of Classification Search
CPC .......... H01M 10/052; H01M 10/0567; H01M 10/0568; H01M 10/0569;
(Continued)

(56) References Cited

U.S. PATENT DOCUMENTS

| | | | | |
|---|---|---|---|---|
| 2008/0193854 A1* | 8/2008 | Yamaguchi | ....... | H01M 10/0587 429/329 |
| 2015/0236379 A1* | 8/2015 | Wietelmann | ...... | H01M 10/0567 429/188 |
| 2018/0198164 A1* | 7/2018 | Mikhaylik | ............ | H01M 4/382 |

FOREIGN PATENT DOCUMENTS

| CN | 1862871 A | 11/2006 |
|---|---|---|
| CN | 1930725 A | 3/2007 |
| CN | 101047271 A | 10/2007 |

OTHER PUBLICATIONS

International Search Report of PCT Patent Application No. PCT/CN2019/108833 dated Jan. 3, 2020.

* cited by examiner

*Primary Examiner* — Victoria H Lynch

(57) ABSTRACT

Provided is a metal-sulfur battery, comprising a positive electrode material, a negative electrode material and an electrolyte, the positive electrode material comprises one of elemental sulfur and S-based compound; the electrolyte comprises a solvent and an electrolyte salt; and the electrolyte salt comprises one or more salts represented by structural formulas 1-3:

Structural formula 1

(Continued)

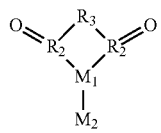

Structural formula 2

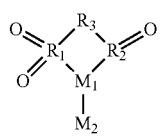

Structural formula 3 wherein, $R_1$ is selected from S or Se; $R_2$ is selected from C, Si, Ge or Sn; $M_1$ is selected from N, B, P, As, Sb or Bi; $M_2$ is selected from Li, Na, K, Ru, Cs, Fr, Al, Mg, Zn, Be, Ca, Sr, Ba or Ra; $R_3$ is selected from a carbon chain or an aromatic ring with part or all of hydrogen substituted by other elements or groups. The metal-sulfur battery provided by the disclosure can effectively solve the short circuit problem caused by metal dendrites on the negative electrode of existing metal-sulfur battery.

12 Claims, 10 Drawing Sheets

(51) Int. Cl.
  *H01M 4/38* (2006.01)
  *H01M 10/052* (2010.01)
  *H01M 10/0567* (2010.01)
  *H01M 10/0569* (2010.01)
(52) U.S. Cl.
  CPC ......... *H01M 4/382* (2013.01); *H01M 10/052* (2013.01); *H01M 10/0567* (2013.01); *H01M 10/0569* (2013.01); H01M 2300/0034 (2013.01); H01M 2300/0037 (2013.01)
(58) Field of Classification Search
  CPC . H01M 2300/0034; H01M 2300/0037; H01M 4/364; H01M 4/38; H01M 4/381; H01M 4/382; H01M 4/5815; H01M 4/625; Y02E 60/10
  See application file for complete search history.

METAL-SULFUR BATTERY

TECHNICAL FILED

The present disclosure belongs to the technical field of batteries, and in particular to a metal-sulfur battery.

BACKGROUND

With the advent of the 21st century, the energy problem is becoming more and more serious, and the environmental pollution continues to deteriorate. In order to achieve sustainable development, the utilization and development of new energy and renewable energy has become a hot research topic all over the world. Water energy, wind energy, hydrogen energy, nuclear energy, tidal energy and solar energy have been vigorously developed and utilized all over the world. The improvement of the performance of energy storage devices can effectively promote the popularization of new energy applications. Among many energy storage devices, electrochemical energy storage battery has become one of the important research directions in the world because of advantages of high energy density, good energy conversion efficiency, less pollution and convenient combination and movement.

Among all kinds of electrochemical energy storage batteries, the theoretical energy density of elemental sulfur or sulfur-based composite/metal battery is as high as 2600 $Wh \cdot Kg^{-1}$, the actual energy density can reach 300 $Wh \cdot kg^{-1}$ at present, which may increase to around 600 $Wh \cdot kg^{-1}$ in the next few years. It is considered as one of the most promising secondary lithium battery systems at present. Alkali metal lithium, sodium or potassium is used as negative electrode, which is very likely to cause lithium, sodium or potassium to form a coating on the surface of the negative electrode due to poor dynamic conditions of the negative electrode during low-temperature charging or high-rate charging. With the growth of the coating, metal dendrites will eventually form. When the metal dendrites accumulate to a certain extent, they will contact the separator, which will cause extrusion and needling on the separator, and eventually lead to mechanical failure of the separator and short circuit between the positive and negative electrodes. The generation of metal dendrites is an important factor affecting the safety performance of batteries.

The existing method for solving the metal dendrites mainly utilizes a plurality of nano technologies to modify the lithium metal current collectors, including carbon ball structures, three-dimensional metal current collectors and the like, but due to relatively complicated process, the cost cannot be further reduced, and the performance is not remarkably improved, thus large-scale production cannot be realized; Secondly, the artificial SEI film generally has the problem of low lithium ion conductivity, which does not meet the current demand for rapid charge and discharge. In recent years, a method for inhibiting the growth of lithium dendrites by effectively regulating the electrolyte has attracted much attention, which mainly solves the problem of uneven space charge distribution caused by low-concentration lithium salts by increasing the concentration of lithium salts in the electrolyte or partly increasing the concentration lithium salts, thereby uniformizing lithium metal deposition and inhibiting the growth of lithium dendrites and the generation of dead lithium. Adding film-forming additives to electrolyte with conventional lithium salt concentration is also an effective means to inhibit lithium dendrites. The above-mentioned existing technical means still can not solve the problem of metal dendrites of metal-sulfur battery.

In addition, when elemental sulfur is used as positive electrode material of lithium ion battery, the dissolution of the intermediate product lithium polysulfide ($Li_2S_n$, $3 \leq n \leq 8$) in the electrolyte leads to the problems of low coulombic efficiency of the battery and low utilization rate of active substances.

SUMMARY

The disclosure provides a metal-sulfur battery aiming at the short circuit problem caused by lithium dendrites grown on the metal lithium of negative electrode in the existing metal-sulfur battery.

The technical solution of the present disclosure to solve the technical problems is as follows:

On one hand, the disclosure provides a metal-sulfur battery, comprising a positive electrode material, a negative electrode material and an electrolyte, the positive electrode material comprises one of elemental sulfur and S-based compound; the electrolyte comprises a solvent and an electrolyte salt; and the electrolyte salt comprises one or more salts represented by structural formulas 1-3:

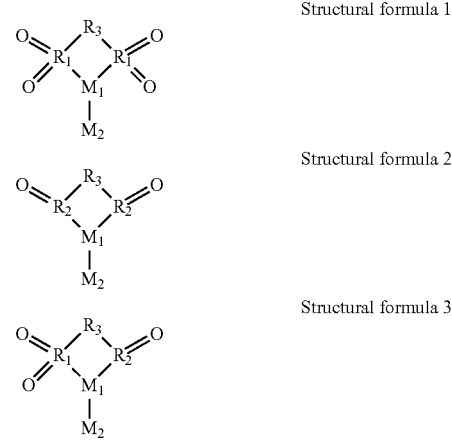

wherein, $R_1$ is selected from S or Se; $R_2$ is selected from C, Si, Ge or Sn; $M_1$ is selected from N, B, P, As, Sb or Bi; $M_2$ is selected from Li, Na, K, Ru, Cs, Fr, Al, Mg, Zn, Be, Ca, Sr, Ba or Ra; $R_3$ is selected from a carbon chain or an aromatic ring with part or all of hydrogen substituted by other elements or groups.

According to the metal-sulfur battery provided by the present disclosure, the inventor has unexpectedly found that when one or more electrolyte salts represented by structural formulas 1-3 are applied to the electrolyte of metal-sulfur battery, the effect of inhibiting the growth of metal dendrites on negative electrode is more than expected, and the battery cycle stability performance, the rate performance, the coulombic efficiency, and the safety performance of the metal-sulfur battery are effectively improved. By contrast, in conventional lithium battery systems such as lithium cobaltate/graphite, the electrolyte containing the compounds represented by the above structural formulas 1-3 does not show the above beneficial effects.

Optionally, the content of the electrolyte salt is 0.01M~10M.

Optionally, in structural formulas 1-3, $R_3$ is selected from a saturated carbon chain containing 1-4 carbons, an unsaturated carbon chain containing 1-4 carbons or an aromatic ring, with part or all of hydrogen substituted by a halogen element or a halogenated hydrocarbyl group.
Optionally, the electrolyte salt comprises one or more of the following compounds:
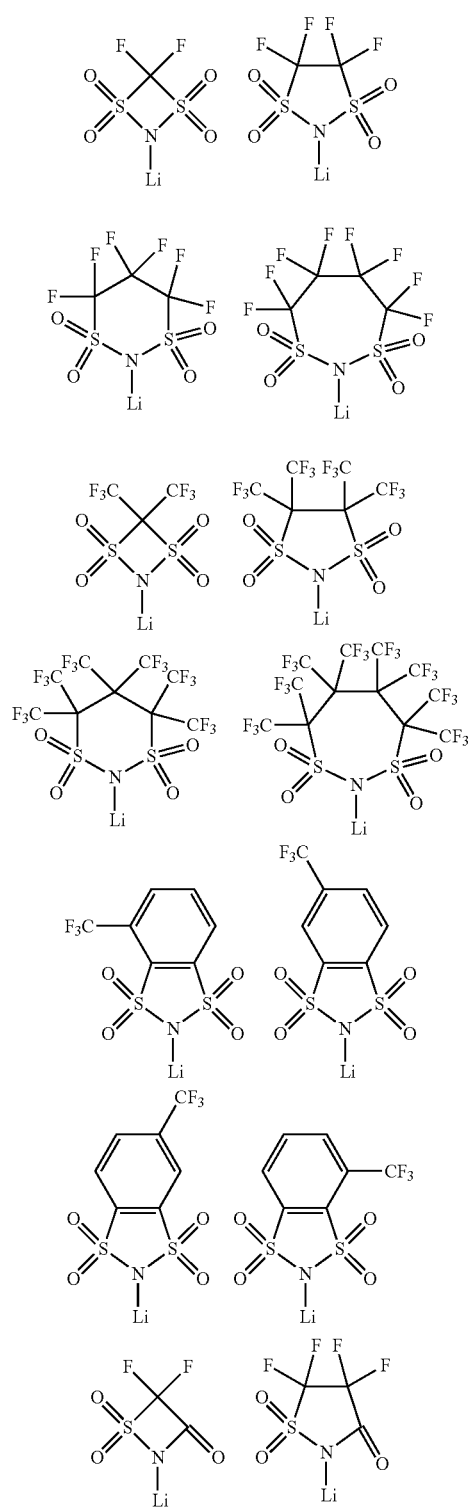
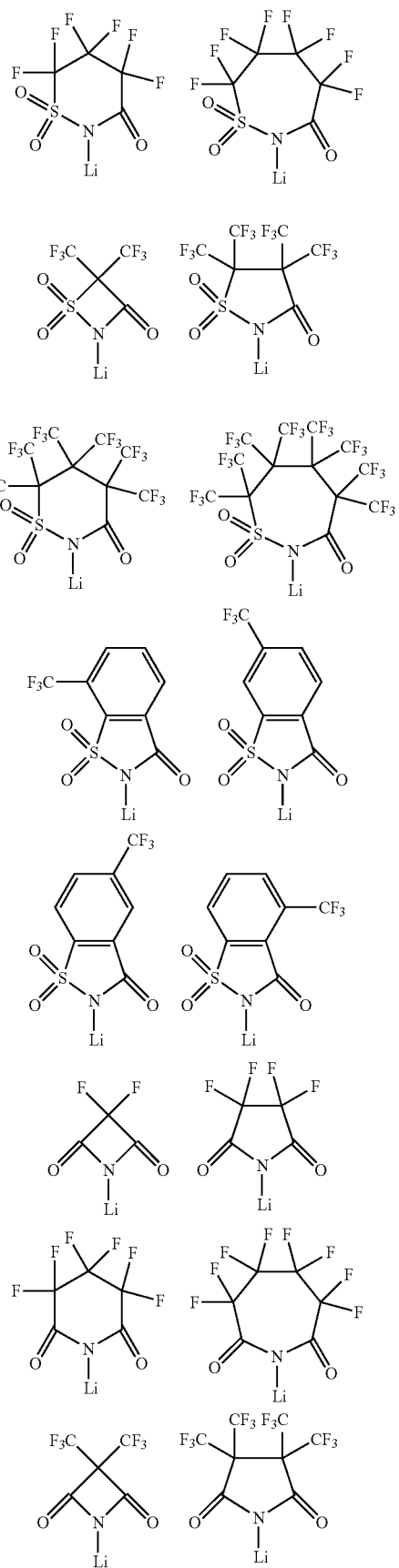

-continued
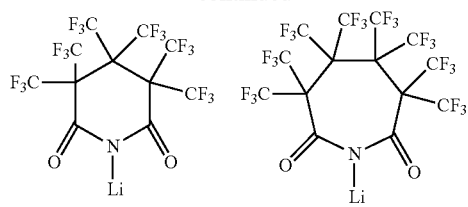
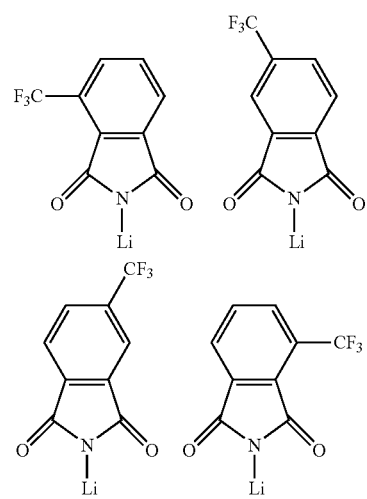
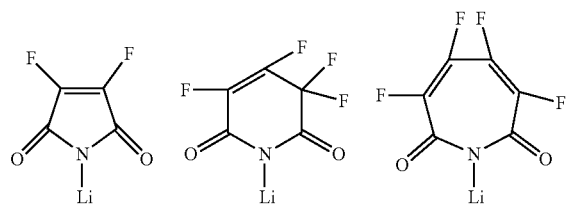
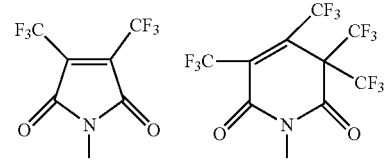
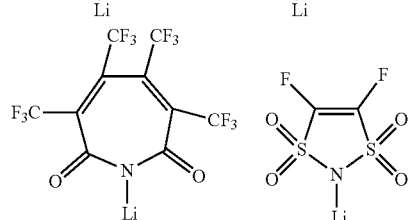
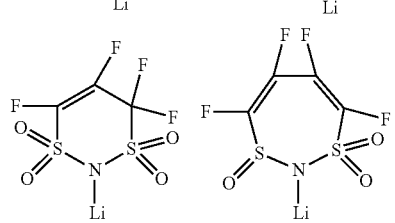
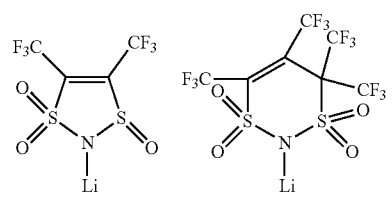
-continued
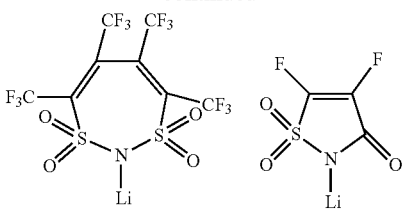
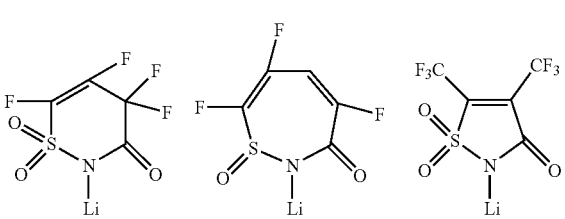
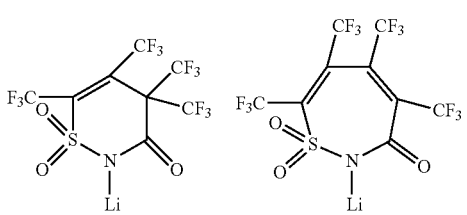
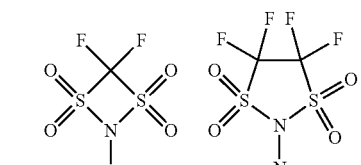
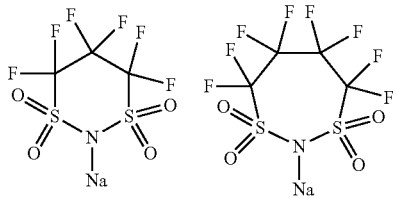
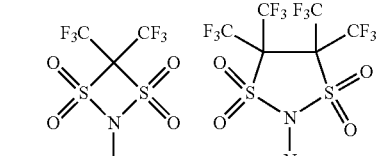
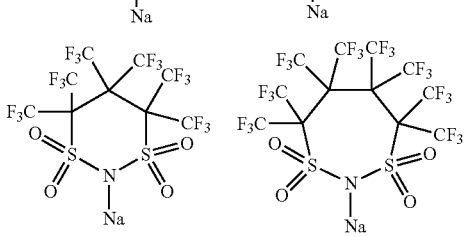
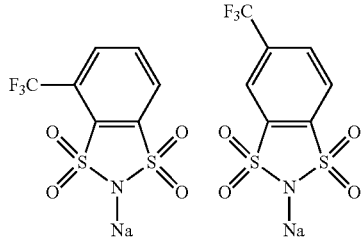

-continued

-continued

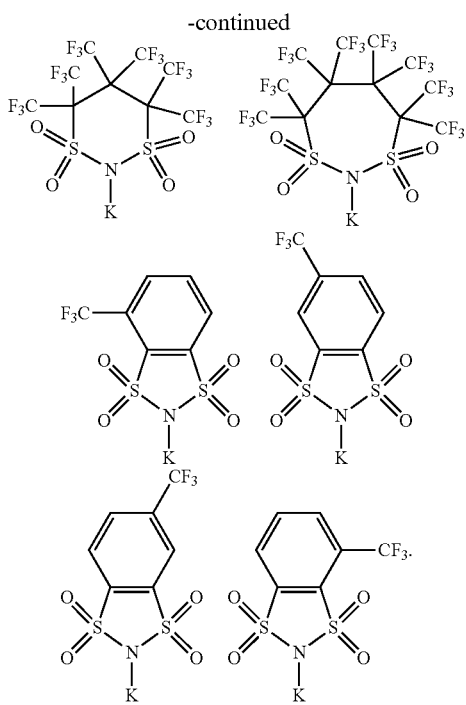

Optionally, the positive electrode material is a sulfur/carbon composite. Preferably, the positive electrode material is a ketjen black/sulfur composite.

Optionally, the electrolyte further comprises a nitrate, and the mass percentage of the nitrate is 0.1%-5% based on the mass of the electrolyte being 100%.

Optionally, the negative electrode material comprises one or more of elemental lithium, elemental sodium, elemental potassium, elemental aluminum and elemental magnesium.

Optionally, the metal-sulfur battery comprises a separator interposed between the positive electrode material and the negative electrode material.

Optionally, the metal-sulfur battery is a lithium-sulfur battery.

Optionally, the solvent is selected from one or more of a fluorinated solvent, ethylene glycol dimethyl ether, 1,3-dioxolane, propylene sulfite and methyl propionate.

According to the metal-sulfur battery provided by the present disclosure, the inventors have unexpectedly found that for a metal-sulfur battery using one or more of a fluorinated solvent, ethylene glycol dimethyl ether, 1,3-dioxolane, propylene sulfite, and methyl propionate as a solvent, the addition of one or more electrolyte salts represented by structural formulas 1-3 can inhibit the dissolution of sulfur in positive electrode material of the metal-sulfur battery during charging and discharging.

Optionally, the fluorinated solvent comprises one or more of fluoroethylene carbonate, 3,3,3-fluoroethyl methyl carbonate and 1,1,2,2-tetrafluoroethyl-2',2',2'-trifluoroethyl ether.

Optionally, the electrolyte salt further comprises one or more of $LiPF_6$, $LiBF_4$, LiBOB, $LiClO_4$, $LiCF_3SO_3$, LiDFOB, $LiN(SO_2CF_3)_2$ and $LiN(SO_2F)_2$.

DETAILED DESCRIPTION OF THE DISCLOSURE

Figure 1:
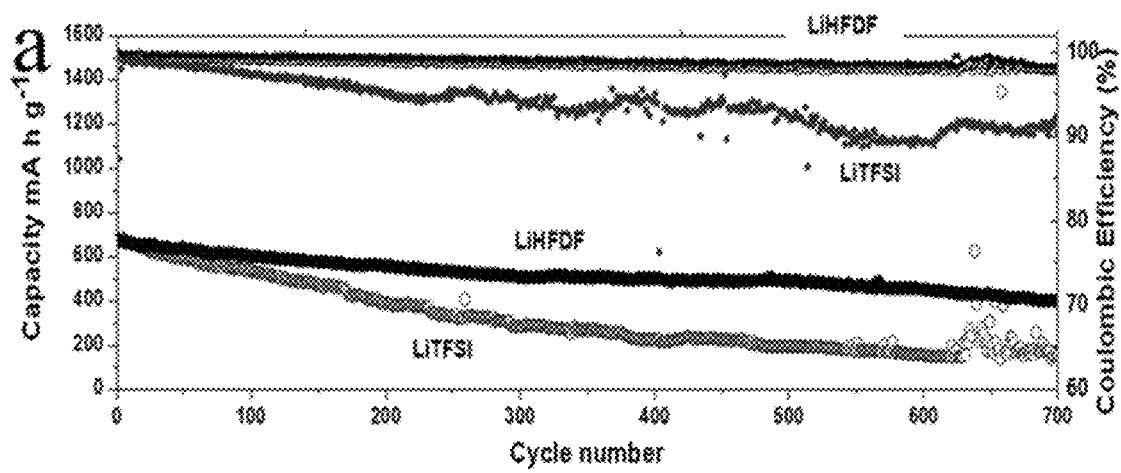
FIG. 1 is a graph of cycle performances of the metal-sulfur batteries with different electrolytes at 1 C current density provided by Embodiment 1 and Comparative example 1 of the present disclosure.

In order to make the technical problems to be solved, technical solutions and beneficial effects provided by the present disclosure clearer, the present disclosure will be further described in detail with reference to the drawings and embodiments. It should be understood that the specific embodiments described herein are only used to explain the present disclosure, not intended to limit the present disclosure.

An embodiment of the present disclosure provides a metal-sulfur battery, including a positive electrode material, a negative electrode material and an electrolyte, the positive electrode material comprises one of elemental sulfur and S-based compound; the electrolyte comprises a solvent and an electrolyte salt; and the electrolyte salt comprises one or more salts represented by structural formulas 1-3:

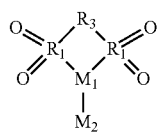

Structural formula 1

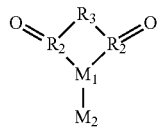

Structural formula 2

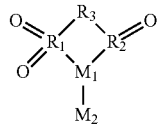

Structural formula 3 wherein, $R_1$ is selected from S or Se; $R_2$ is selected from C, Si, Ge or Sn; $M_1$ is selected from N, B, P, As, Sb or Bi; $M_2$ is selected from Li, Na, K, Ru, Cs, Fr, Al, Mg, Zn, Be, Ca, Sr, Ba or Ra; $R_3$ is selected from a carbon chain or an aromatic ring with part or all of hydrogen substituted by other elements or groups.

One or more electrolyte salts represented by structural formulas 1-3 are applied to the electrolyte of metal-sulfur battery, the effect of inhibiting the growth of metal dendrites on negative electrode is more than expected, and the battery cycle stability performance, the rate performance, the coulombic efficiency, and the safety performance of the metal-sulfur battery are effectively improved.

In some embodiments, the content of the electrolyte salt is 0.01M~10M, preferably 0.1M~5M.

In a more preferred embodiment, the content of the electrolyte salt is 0.1M~2M.

In some embodiments, in structural formulas 1-3, $R_3$ is selected from a saturated carbon chain containing 1-4 carbons, an unsaturated carbon chain containing 1-4 carbons or an aromatic ring, with part or all of hydrogen substituted by a halogen element or a halogenated hydrocarbyl group In some embodiments, the electrolyte salt includes one or more of the following compounds:

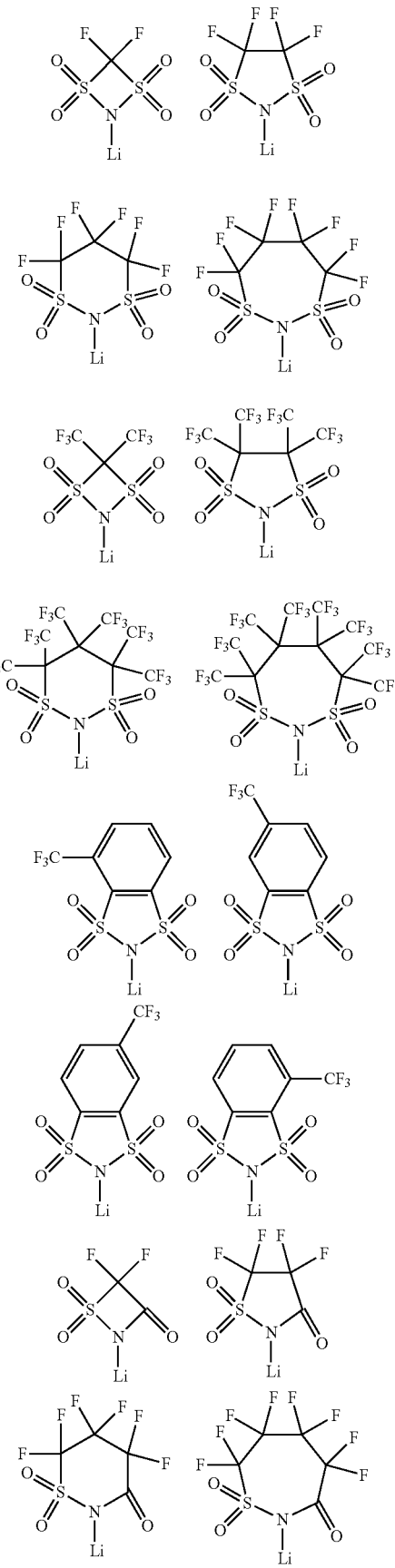

-continued
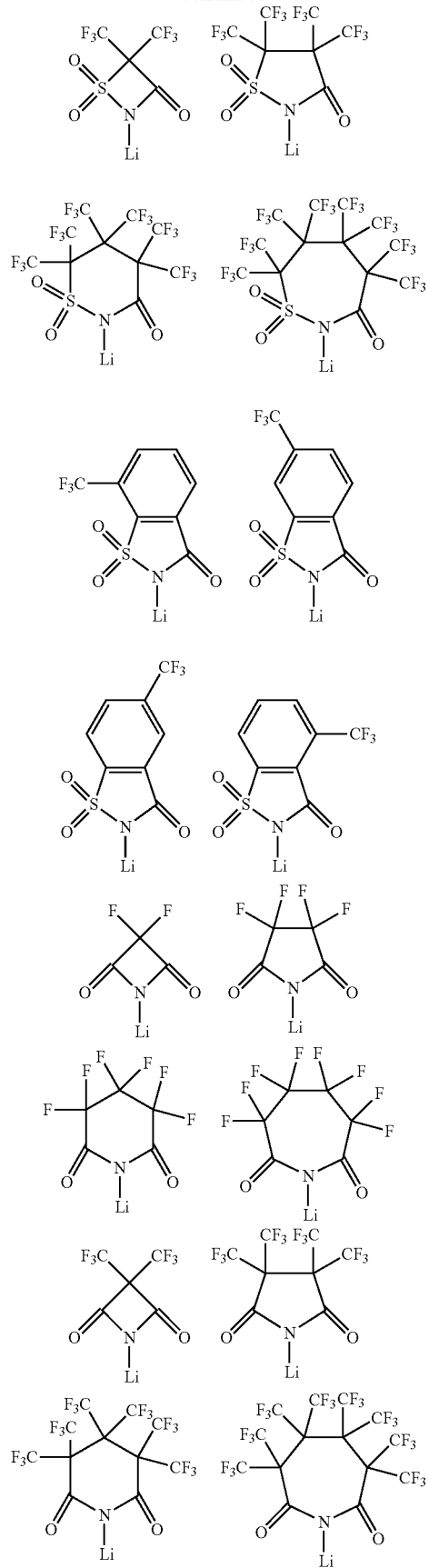
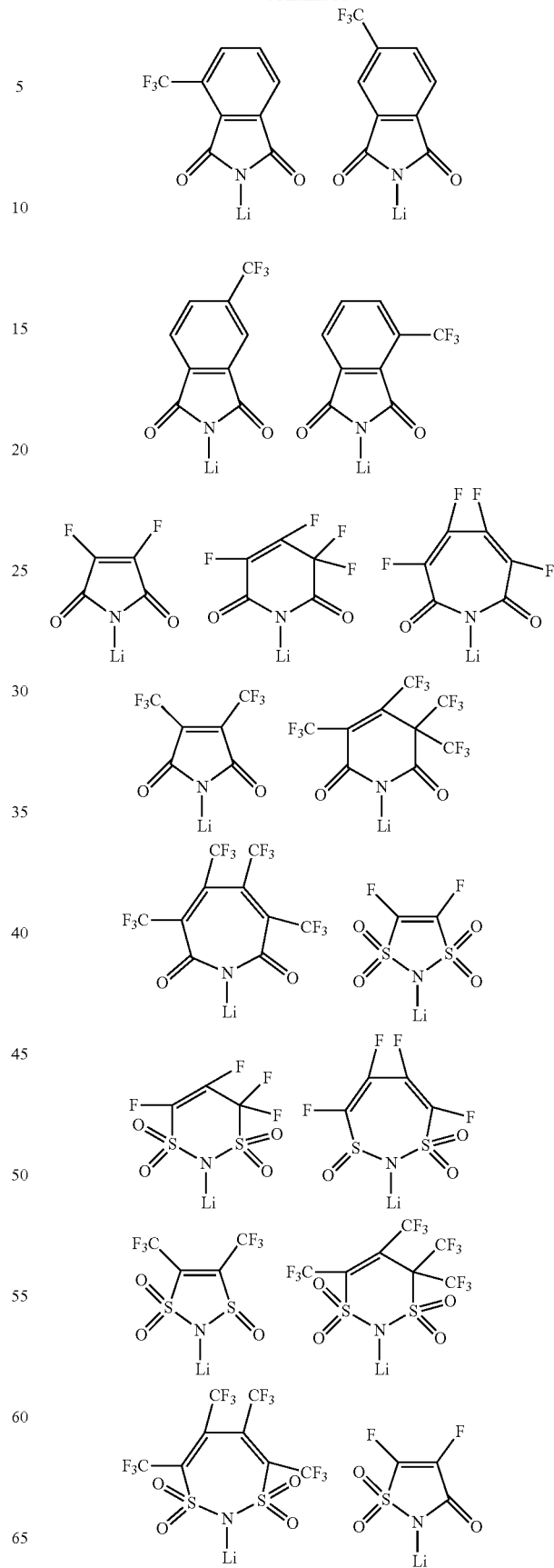

-continued
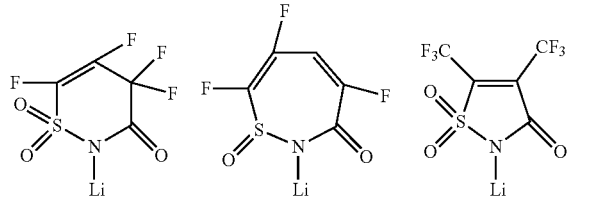
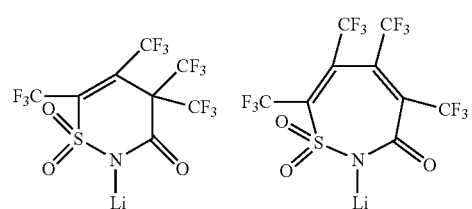
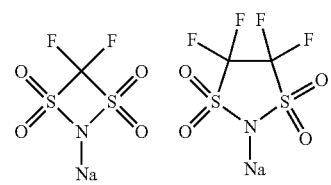
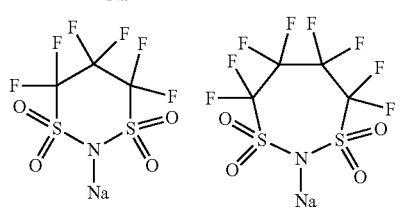
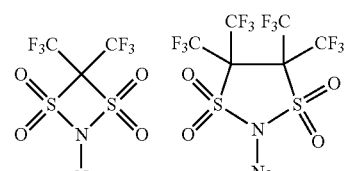
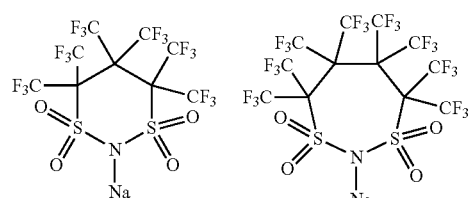
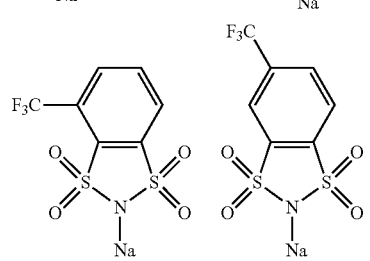
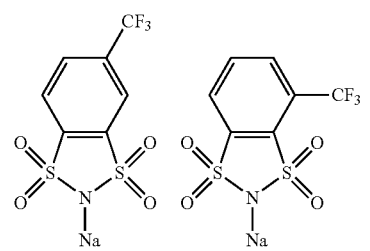
-continued
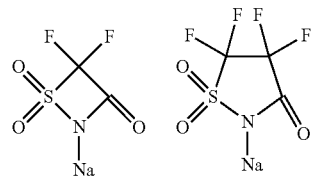
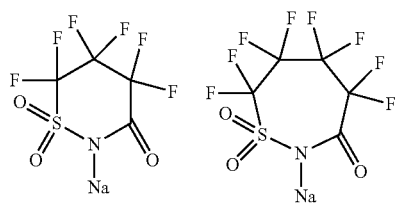
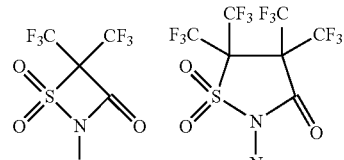
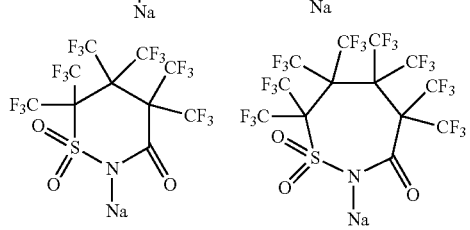
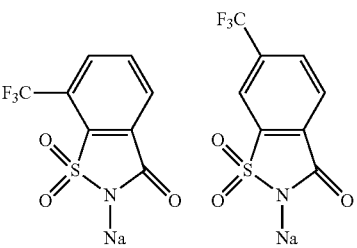
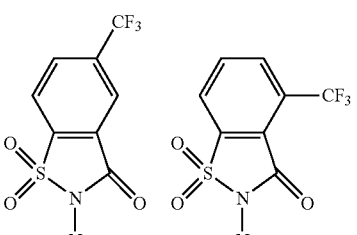
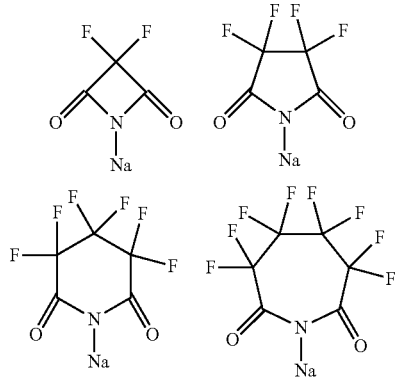

-continued

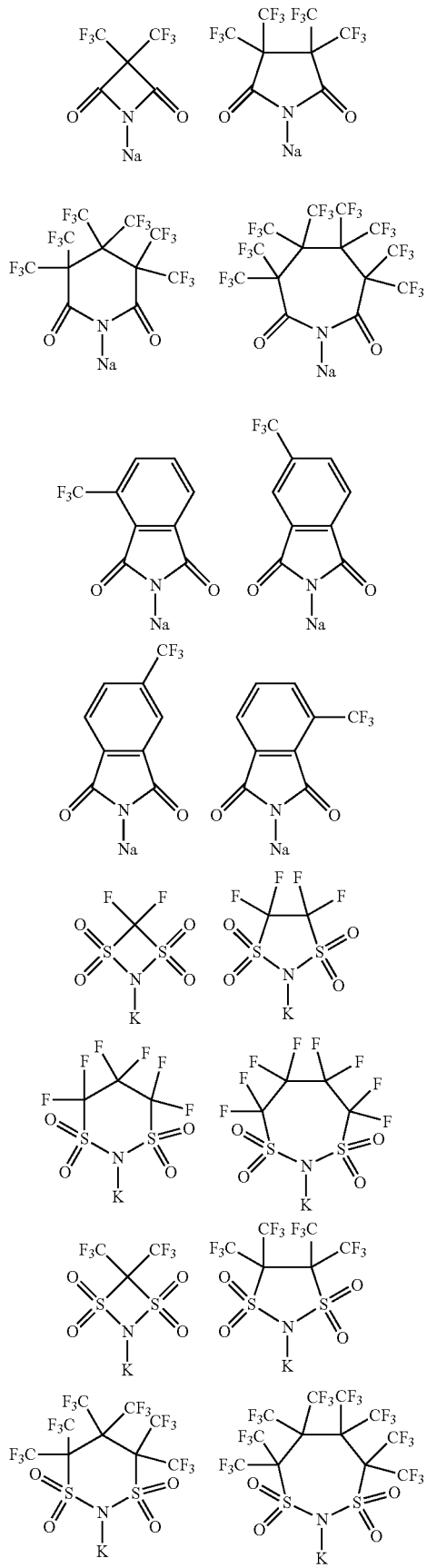

-continued

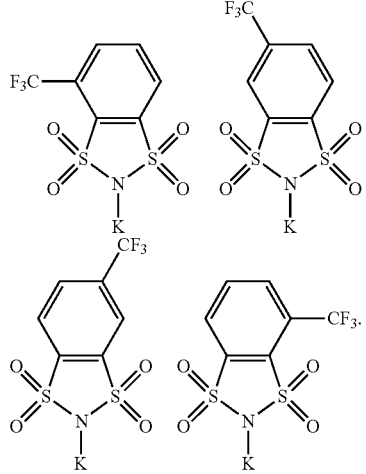

In some embodiments, the solvent includes one or more of ethylene glycol dimethyl ether (DME), dimethyl carbonate (DMC), 1,3-dioxolane (DOL), vinylene carbonate (VC), propylene carbonate (PC), ethylene carbonate (EC), diethyl carbonate (DEC), ethyl methyl carbonate (EMC), fluoroethylene carbonate (FEC), propylene sulfite (PS) and methyl propionate (PA).

Preferably, the positive electrode material is a sulfur/carbon composite. More preferably, it is a ketjen black/sulfur composite.

In a more preferred embodiment, the solvent is a mixture of 1,3-dioxolane (DOL) and ethylene glycol dimethyl ether (DME).

Specifically, in the solvent, the mass ratio of 1,3-dioxolane (DOL) to ethylene glycol dimethyl ether (DME) is 0.1~10. In a more preferred embodiment, the mass ratio of 1,3-dioxolane (DOL) and ethylene glycol dimethyl ether (DME) is 1:1.

In some embodiments, the electrolyte further includes a nitrate, and the mass percentage of the nitrate is 0.1%~5% based on the mass of the electrolyte being 100%.

Through a large number of experiments, the inventors found that the nitrate and electrolyte salts represented by structural formulas 1-3 can be used together to improve the cycle performance of the battery more effectively.

In some embodiments, the negative electrode material comprises one or more of elemental lithium, elemental sodium, elemental potassium, elemental aluminum and elemental magnesium.

In a preferred embodiment, cations in the nitrate are selected from the same metal elements as the negative electrode material, and when the negative electrode material is selected from Li, the nitrate is selected from $LiNO_3$; when the negative electrode material is selected from Na, the nitrate is selected from $NaNO_3$; and when the negative electrode material is selected from K, the nitrate is selected from $KNO_3$.

In a preferred embodiment, in structural formulas 1-3, $M_2$ is selected from the same metal element as the negative electrode material, and when the negative electrode material is selected from Li, $M_2$ is selected from $Li^+$; when the negative electrode material is selected from Na, the $M_2$ is selected from $Na^+$; when the negative electrode material is selected from K, $M_2$ is selected from $K^+$.

In some embodiments, the metal-sulfur battery further includes a separator interposed between the positive electrode material and the negative electrode material.

The metal-sulfur battery provided by the embodiment of the present disclosure can effectively inhibit the growth of metal dendrites on the negative electrode because of containing the above electrolyte, and has better battery cycle stability, rate performance, coulombic efficiency and safety performance.

In a preferred embodiment, the metal-sulfur battery is a lithium-sulfur battery.

In some embodiments, the solvent is selected from one or more of a fluorinated solvent, ethylene glycol dimethyl ether, 1,3-dioxolane, propylene sulfite and methyl propionate.

According to the metal-sulfur battery provided by the present disclosure, the inventors have unexpectedly found that for a metal-sulfur battery using one or more of a fluorinated solvent, ethylene glycol dimethyl ether, 1,3-dioxolane, propylene sulfite, and methyl propionate as a solvent, the addition of one or more electrolyte salts represented by structural formulas 1-3 can inhibit the dissolution of sulfur in positive electrode material of the metal-sulfur battery during charging and discharging.

In some embodiments, the solvent is selected from two of a fluorinated solvent, ethylene glycol dimethyl ether and 1,3-dioxolane. Preferably, the volume ratio between them is 1:2-2:1.

In some embodiments, the fluorinated solvent comprises one or more of fluoroethylene carbonate, 3,3,3-fluoroethyl methyl carbonate and 1,1,2,2-tetrafluoroethyl-2',2',2'-trifluoroethyl ether.

In some embodiments, the electrolyte salt further comprises one or more of $LiPF_6$, $LiBF_4$, LiBOB, $LiClO_4$, $LiCF_3SO_3$, LiDFOB, $LiN(SO_2CF_3)_2$ and $LiN(SO_2F)_2$.

The present disclosure will be further explained by the following embodiments.

Embodiment 1

The embodiment is used for explaining the metal-sulfur battery and the preparation method thereof disclosed by the disclosure, and includes the following steps:

Preparation of battery: Sulfur and Ketjen Black were mixed at a mass ratio of 1:3, and heated at 155° C. for 12 hours to obtain C/S composite with sulfur content of 66%. The composite was mixed with 10 wt % PVDF-NMP solution, and the mixed slurry was coated on aluminum foil, dried in vacuum at 60° C. for 12 hours, and then cut into wafers with a diameter of 12 mm, which were used as the positive electrode of button cell. The separator was celgard 2325, and the negative electrode was lithium sheet with a diameter of 16 mm and a thickness of 0.4 mm. The amount of electrolyte was 20 ul/mgS, and the electrolyte was selected from electrolyte A.

Electrolyte A: 1M lithium 1,1,2,2,3,3-hexafluoropropane-1,3-disulfonimide was dissolved in the solvent of DOL:DME=1:1, and then 1 wt % of $LiNO_3$ was added as additive to obtain a battery electrolyte, labeled LiHFDF.

Comparative Example 1

This comparative example is used to contrastively illustrate the metal-sulfur battery and its preparation method disclosed in the present application, it was the same as Embodiment 1 except that:

the electrolyte is selected from electrolyte B.

Electrolyte B: 1M lithium bistrifluoromethanesulfonimide was dissolved in the solvent of DOL:DME=1:1, and then 1 wt % of $LiNO_3$ was added as additive to obtain a battery electrolyte, labeled LiTFSI.

Embodiments 2~25

Embodiments 2~25 are used to illustrate the metal-sulfur battery and its preparation method disclosed in the present application, they were the same as Embodiment 1 except that:

the adopted positive electrode material, negative electrode material, electrolyte solvent and electrolyte additive are shown in Embodiments 2-25 of Table 1.

Comparative Example 2~17

Comparative example 2~17 are used to contrastively illustrate the metal-sulfur battery and its preparation method disclosed in the present application, they were the same as Embodiment 1 except that:

the adopted positive electrode material, negative electrode material, electrolyte solvent and electrolyte additive are shown in Comparative example 2~17 of Table 1.

Embodiment 26

The embodiment is used to explain the metal-sulfur battery and the preparation method thereof disclosed by the disclosure, and includes the following steps:

(1) lithium 1,1,2,2,3,3-hexafluoropropane-1,3-disulfonimide (abbreviated as LiHFDF) was added into an aluminum can as lithium salt, wherein LiHFDF was purchased from TCI company, and the purity was 98%; then 3 mL solvent of DME:DOL=1:1 vol % was added into the aluminum can with a pipette, then the aluminum can was sealed and placed on a magnetic stirring table and stirred for 12 hours until lithium salt dissolved to obtain electrolyte, the magnetic stirring temperature was controlled at 30° C. for 12 h, the LiHFDF concentration was 1M, and 1% lithium nitrate was added, the whole preparation process of electrolyte was carried out in a glove box with argon atmosphere, and the water content was <1 ppm, oxygen content was <1 ppm;

(2) a 2025 button battery was prepared using the electrolyte obtained from step 1, the 2025 button battery was assembled using a copper foil with a diameter of 16 mm as counter electrode and a lithium metal sheet of 16 mm, and the separator of the 2025 button battery was PP2400, with a diameter of 19 mm.

Embodiment 27

Embodiment 27 is used to illustrate the metal-sulfur battery and its preparation method disclosed in the present application, it was the same as Embodiment 26 except that:

In the first step, the solvent adopted was DMC:EC:DEC=1:1:1 vol %.

Embodiment 28

Embodiment 28 is used to illustrate the metal-sulfur battery and its preparation method disclosed in the present application, it was the same as Embodiment 26 except that:

In the first step, the adopted lithium salts were LiHFDF and LiTFSI, and the concentration of LiHFDF was 0.2M, and the concentration of LiTFSI was 1M.

Comparative Example 18

Comparative example 18 is used to contrastively illustrate the metal-sulfur battery and its preparation method disclosed in the present application, it was the same as Embodiment 26 except that:

In the first step, LiTFSI was adopted as lithium salt to replace LiHFDF of Embodiment 26, and the concentration of LiTFSI was 1M.

Comparative Example 19

Comparative example 19 is used to contrastively illustrate the metal-sulfur battery and its preparation method disclosed in the present application, it was the same as Embodiment 27 except that:

In the first step, LiTFSI was adopted as lithium salt to replace LiHFDF of Embodiment 27, and the concentration of LiTFSI was 1M.

Comparative Example 20

Comparative example 20 is used to contrastively illustrate the metal-sulfur battery and its preparation method disclosed in the present application, it was the same as Embodiment 28 except that:

In the first step, the electrolyte did not include LiHFDF.

Performance Test

Figure 2:
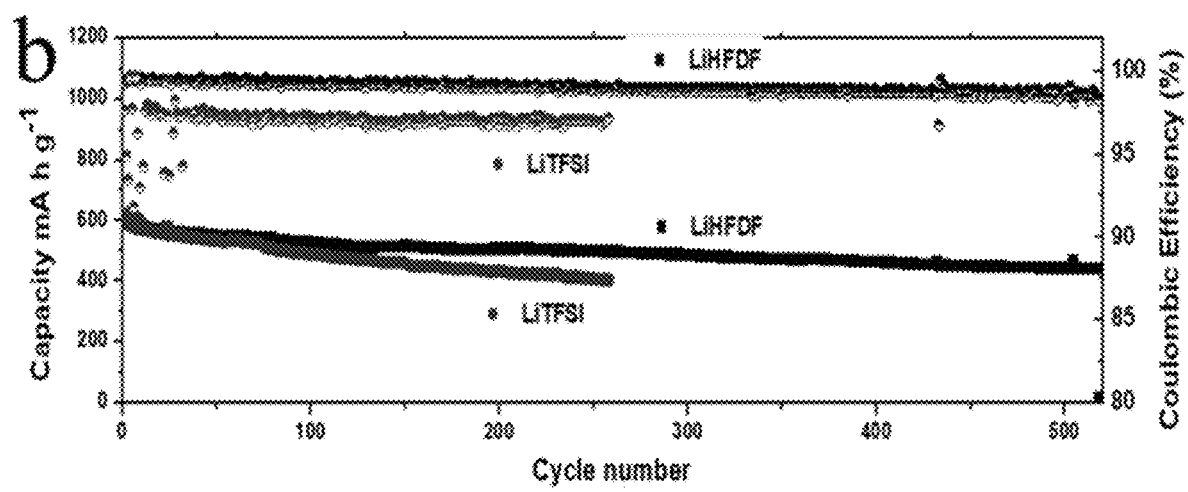
FIG. 2 is a graph of cycle performances of the metal-sulfur batteries with different electrolytes at 2 C current density provided by Embodiment 1 and Comparative example 1 of the present disclosure.

1. Test the cycle performance of the metal-sulfur batteries prepared by Embodiment 1 and Comparative example 1. The test results are shown in FIG. 1 and FIG. 2. The four groups of data from top to bottom in FIG. 1 are coulombic efficiency data of Embodiment 1, coulombic efficiency data of Comparative example 1, battery capacity data of Embodiment 1 and battery capacity data of Comparative example 1 at 1 C current density. The four groups of data from top to bottom in FIG. 2 are coulombic efficiency data of Embodiment 1, coulombic efficiency data of Comparative example 1, battery capacity data of Embodiment 1 and battery capacity data of Comparative example 1 at 2 C current density.

It can be seen from FIG. 1 that when the electrolyte provided by the present disclosure was used in Embodiment 1, the first discharge capacity of the battery was 695 at a current density of 1 C (1675 mAg$^{-1}$), after 700 cycles, the battery capacity could still be maintained at 490 mAhg$^{-1}$, and the capacity fade of each cycle was 0.04%; in contrast, Comparative example 1 used the electrolyte with LiTFSI (Lithium bistrifluoromethanesulfonimide) as lithium salt, its first discharge capacity was 690 mAhg$^{-1}$, after 700 cycles, the battery capacity was 190 mAhg$^{-1}$, and the capacity fade of each cycle was 0.1%. In addition, after 700 cycles, the coulombic efficiency of the metal-sulfur battery provided by Embodiment 1 could still maintain at 97%, while the coulombic efficiency of the metal-sulfur battery provided by Comparative example 1 decreased to about 92% after 700 cycles. It can be seen from FIG. 1 that the electrolyte provided by the present disclosure can effectively improve the cycle stability and coulombic efficiency of the metal-sulfur battery.

As can be seen from FIG. 2, when the current density was 2 C, the result was similar to that when the current density was 1 C.

2. Test the batteries prepared by Embodiment 20 and Comparative example 17 for 500 cycles at a current density of 0.5 C, and the results are shown in FIG. 3.

Figure 3:
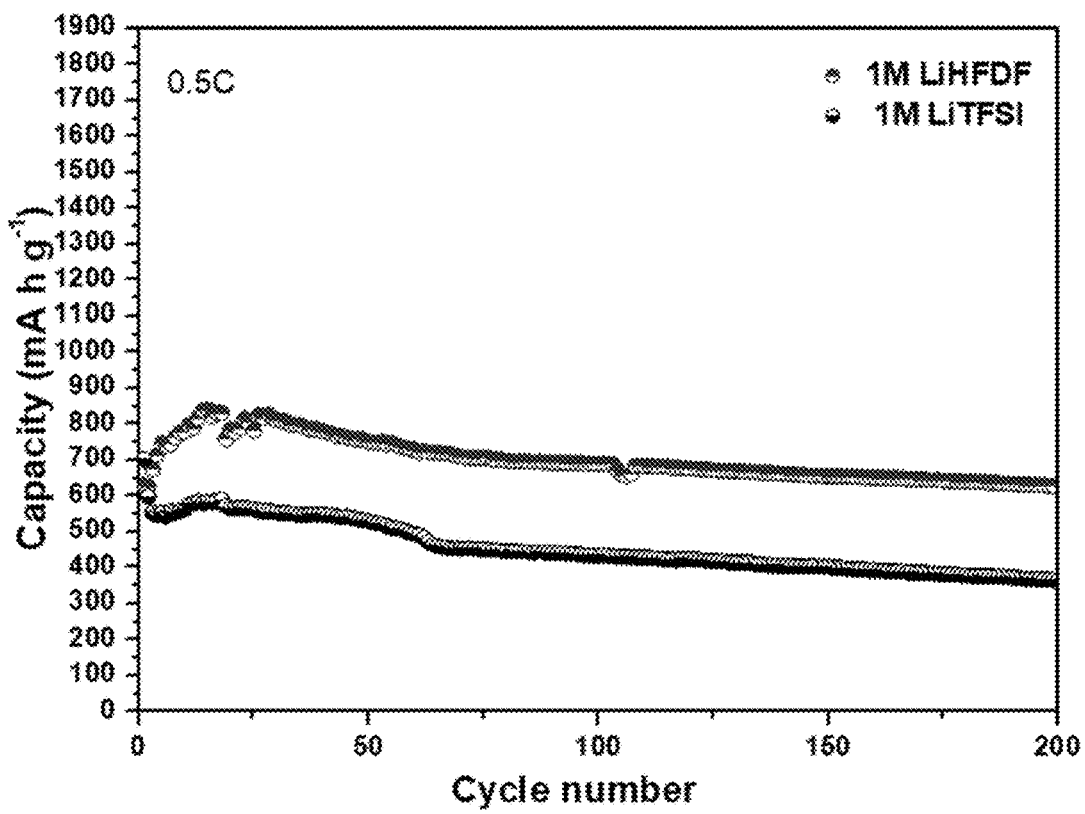
FIG. 3 is a graph of cycle performances of the batteries provided by Embodiment 20 and Comparative example 17 of the present disclosure.

It can be seen from FIG. 3 that when the current density was 0.5 C, the capacity of the battery could reach 628 mAhg$^{-1}$ after 200 cycles when using 1M LiHFDF electrolyte without adding lithium nitrate, and the battery capacity quickly decreased to 363 mAhg$^{-1}$ after 200 cycles when using 1M LiTFSI electrolyte without adding lithium nitrate. FIG. 3 further shows that LiHFDF can effectively improve the cycle performance of metal-sulfur battery.

3. Test the batteries prepared by Embodiment 24 and Comparative example 17 for 500 cycles at current density of 0.5 C and 1 C, and the test results are shown in FIG. 4 and FIG. 5.

Figure 4:
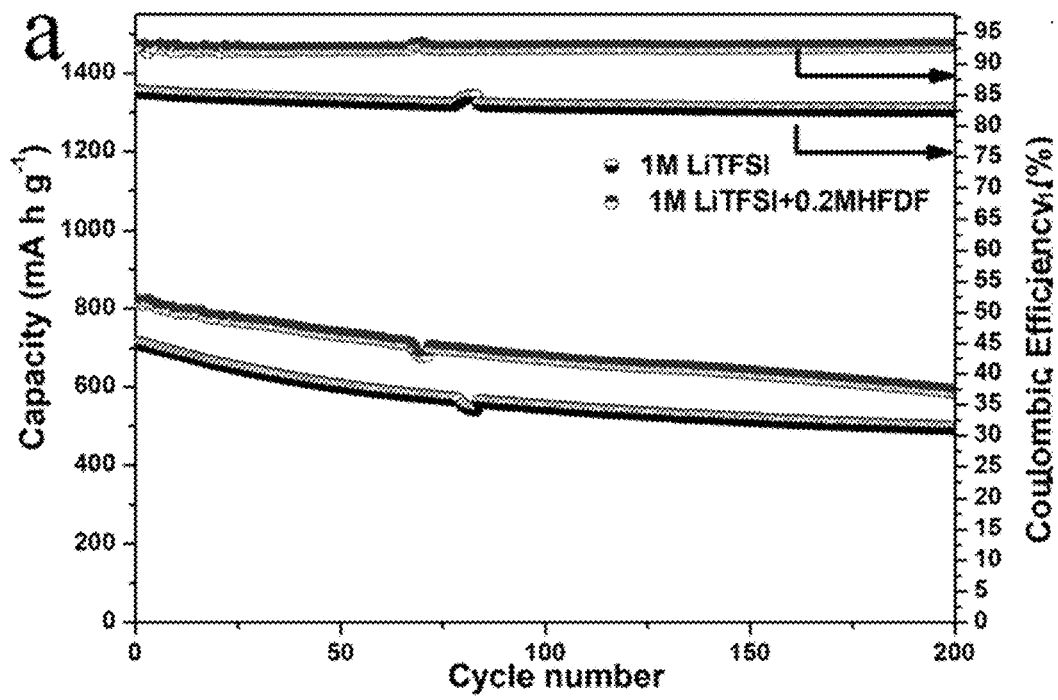
FIG. 4 is a graph of cycle performances of the batteries at 0.5 C current density provided by Embodiment 24 and Comparative example 17 of the present disclosure.
Figure 5:
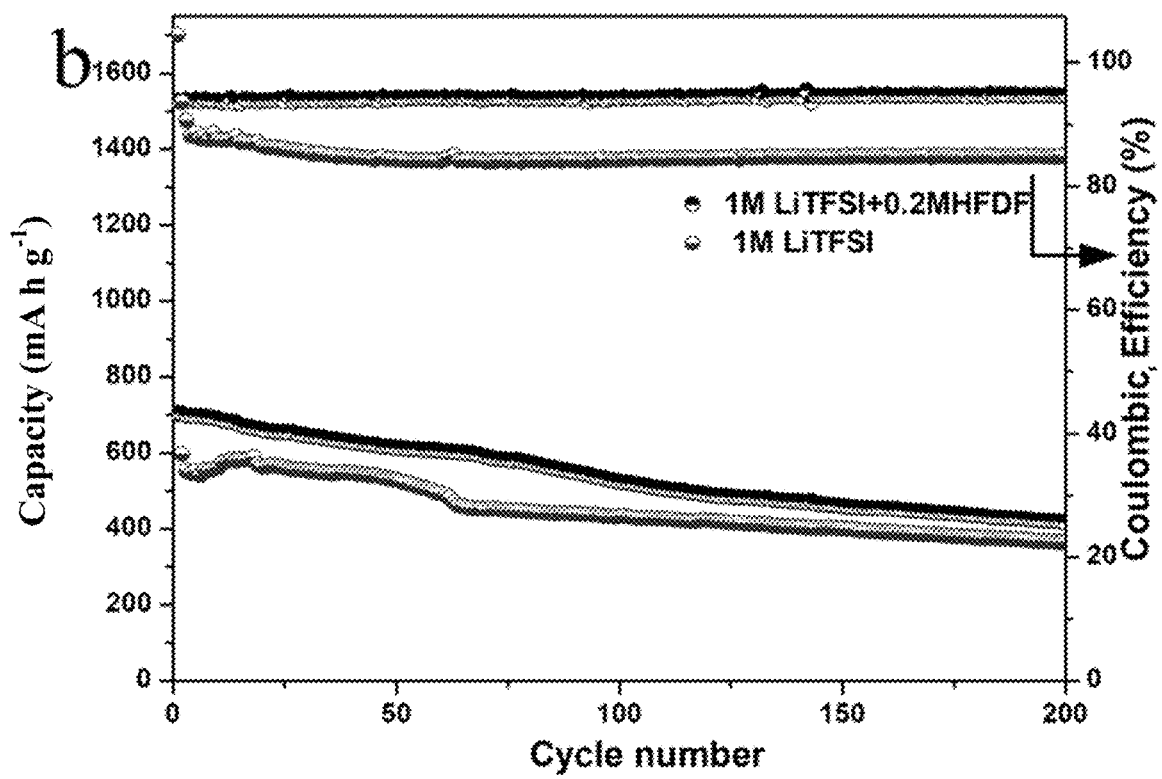
FIG. 5 is a graph of cycle performances of the batteries at 1 C current density provided by Embodiment 24 and Comparative example 17 of the present disclosure.

It can be seen from FIG. 4 that the coulombic efficiency of the battery provided by the present disclosure using LiTFSI electrolyte without lithium nitrate was only 82% after 200 cycles at a current density of 0.5 C; while the coulombic efficiency of the battery still reached 92% after 200 cycles by adding 0.2M LiHFDF into LiTFSI electrolyte without lithium nitrate, indicating that LiHFDF can effectively improve the coulombic efficiency of the battery. It can be seen from FIG. 5 that, in the absence of lithium nitrate, the coulombic efficiency of the battery using LiTFSI electrolyte was 82% at the current density of 1 C; while the coulombic efficiency of the battery increased to 95% after adding LiHFDF, which further indicated that LiHFDF could effectively improve the coulombic efficiency of the battery.

4. Test the cycle performance of the metal-sulfur batteries prepared by Embodiments 1-25 and Comparative examples 1-17, and the test results were shown in Table 1.

TABLE 1

| Sample | Positive electrode material | Negative electrode material | Electrolyte solvent | Electrolyte additive | Battery capacity corresponding to cycle number (mAhg$^{-1}$) | | | |
|---|---|---|---|---|---|---|---|---|
| | | | | | 1 | 10 | 100 | 500 |
| Embodiment 1 | C/S composite (Sulfur:Ketjen Black = 1:3) | Lithium sheet | DOL:DME = 1:1 | 1M lithium 1,1,2,2,3,3-hexafluoropropane-1,3-disulfonimide; 1 wt % LiNO$_3$ | 695 | 626 | 614 | 540 |
| Embodiment 2 | C/S composite (Sulfur:Ketjen Black = 1:3) | Sodium sheet | DOL:DME = 1:1 | 1M sodium 1,1,2,2,3,3-hexafluoropropane-1,3-disulfonimide | 530 | 515 | 460 | 352 |
| Embodiment 3 | C/S composite (Sulfur:Ketjen Black = 1:3) | potassium sheet | DOL:DME = 1:1 | 1M potassium 1,1,2,2,3,3-hexafluoropropane-1,3-disulfonimide | 512 | 493 | 435 | 326 |
| Embodiment 4 | C/S composite (Sulfur:Ketjen Black = 1:3) | Lithium sheet | DOL:DME = 1:1 | 1.2M lithium 1,1,2,2,3,3-hexafluoropropane-1,3-disulfonimide; 1 wt % LiNO$_3$ | 705 | 680 | 630 | 489 |

TABLE 1-continued

| Sample | Positive electrode material | Negative electrode material | Electrolyte solvent | Electrolyte additive | Battery capacity corresponding to cycle number (mAhg$^{-1}$) | | | |
|---|---|---|---|---|---|---|---|---|
| | | | | | 1 | 10 | 100 | 500 |
| Embodiment 5 | C/S composite (Sulfur:Ketjen Black = 1:3) | Lithium sheet | DOL:DME = 1:1 | 1.3M lithium 1,1,2,2,3,3-hexafluoropropane-1,3-disulfonimide; 1 wt % LiNO$_3$ | 704 | 693 | 634 | 496 |
| Embodiment 6 | C/S composite (Sulfur:Ketjen Black = 1:3) | Lithium sheet | DOL:DME = 1:1 | 1.4M lithium 1,1,2,2,3,3-hexafluoropropane-1,3-disulfonimide; 1 wt % LiNO$_3$ | 705 | 710 | 658 | 523 |
| Embodiment 7 | C/S composite (Sulfur:Ketjen Black = 1:3) | Lithium sheet | EC:DME = 1:1 | 1M lithium 1,1,2,2,3,3-hexafluoropropane-1,3-disulfonimide; 1 wt % LiNO$_3$ | 703 | 685 | 520 | 485 |
| Embodiment 8 | C/S composite (Sulfur:Ketjen Black = 1:3) | Lithium sheet | FEC:DOL = 1:1 | 1M lithium 1,1,2,2,3,3-hexafluoropropane-1,3-disulfonimide; 1 wt % LiNO$_3$ | 690 | 658 | 534 | 474 |
| Embodiment 9 | C/S composite (Sulfur:Ketjen Black = 1:3) | Lithium sheet | FEC:DME = 1:1 | 1M lithium 1,1,2,2,3,3-hexafluoropropane-1,3-disulfonimide; 1 wt % LiNO$_3$ | 704 | 690 | 635 | 526 |
| Embodiment 10 | C/S composite (Sulfur:Ketjen Black = 1:3) | Lithium sheet | VC:DME = 1:1 | 1M lithium 1,1,2,2,3,3-hexafluoropropane-1,3-disulfonimide; 1 wt % LiNO$_3$ | 702 | 687 | 645 | 513 |
| Embodiment 11 | C/S composite (Sulfur:Ketjen Black = 1:3) | Lithium sheet | PC:DME = 1:1 | 1M lithium 1,1,2,2,3,3-hexafluoropropane-1,3-disulfonimide; 1 wt % LiNO$_3$ | 698 | 680 | 634 | 521 |
| Embodiment 12 | C/S composite (Sulfur:Ketjen Black = 1:3) | Lithium sheet | DEC:DME = 1:1 | 1M lithium 1,1,2,2,3,3-hexafluoropropane-1,3-disulfonimide; 1 wt % LiNO$_3$ | 703 | 694 | 653 | 498 |
| Embodiment 13 | C/S composite (Sulfur:Ketjen Black = 1:3) | Lithium sheet | EMC:DME = 1:1 | 1M lithium 1,1,2,2,3,3-hexafluoropropane-1,3-disulfonimide; 1 wt % LiNO$_3$ | 695 | 640 | 643 | 498 |
| Embodiment 14 | C/S composite (Sulfur:Ketjen Black = 1:3) | Lithium sheet | PS:DME = 1:1 | 1M lithium 1,1,2,2,3,3-hexafluoropropane-1,3-disulfonimide; 1 wt % LiNO$_3$ | 703 | 695 | 613 | 491 |
| Embodiment 15 | C/S composite (Sulfur:Ketjen Black = 1:3) | Lithium sheet | PA:DME = 1:1 | 1M lithium 1,1,2,2,3,3-hexafluoropropane-1,3-disulfonimide; 1 wt % LiNO$_3$ | 682 | 670 | 536 | 357 |
| Embodiment 16 | C/S composite (Sulfur:Ketjen Black = 1:3) | Lithium sheet | DOL:DME = 1:1 | 1M lithium 1,1-difluoromethane-disulfonimide; 1 wt % LiNO$_3$ | 704 | 659 | 534 | 347 |
| Embodiment 17 | C/S composite (Sulfur:Ketjen Black = 1:3) | Lithium sheet | DOL:DME = 1:1 | 1M lithium 1,1,2,2-tetrafluoroethane-1,2-disulfonimide; 1 wt % LiNO$_3$ | 715 | 670 | 540 | 379 |
| Embodiment 18 | C/S composite (Sulfur:Ketjen Black = 1:3) | Lithium sheet | DOL:DME = 1:1 | 1M lithium 1,1,2,2,3,3,4,4-octafluorobutane-1,4-disulfonimide; 1 wt % LiNO$_3$ | 716 | 680 | 640 | 480 |
| Embodiment 19 | C/S composite (Sulfur:Ketjen Black = 1:3) | Lithium sheet | DOL:DME = 1:1 | 1M lithium 1,1,2,2,3,3-hexafluoropropane-1-sulfonyl-3-sulfonimide; 1 wt % LiNO$_3$ | 723 | 688 | 614 | 413 |
| Embodiment 20 | C/S composite (Sulfur:Ketjen Black = 1:3) | Lithium sheet | DOL:DME = 1:1 | 1M lithium 1,1,2,2,3,3-hexafluoropropane-1,3-disulfonimide | 715 | 686 | 613 | 402 |
| Embodiment 21 | C/S composite (Sulfur:Ketjen Black = 1:3) | Lithium sheet | DOL:DME = 1:1 | 1M lithium 1,1,2,2,3,3-hexafluoropropane-1,3-dicarboxyimide; 1 wt % LiNO$_3$ | 713 | 689 | 628 | 489 |
| Embodiment 22 | C/S composite (Sulfur:Ketjen Black = 1:3) | Lithium sheet | DOL:DME = 1:1 | 1M lithium 1,2,3,3-tetrafluoro-1-propene-1,3-disulfonimide | 671 | 661 | 568 | 451 |

TABLE 1-continued

| Sample | Positive electrode material | Negative electrode material | Electrolyte solvent | Electrolyte additive | Battery capacity corresponding to cycle number (mAhg$^{-1}$) | | | |
|---|---|---|---|---|---|---|---|---|
| | | | | | 1 | 10 | 100 | 500 |
| Embodiment 23 | C/S composite (Sulfur:Ketjen Black = 1:3) | Lithium sheet | DOL:DME = 1:1 | 1M lithium 1,1,2,2,3,3-hexafluoropropane-1-carboxylic acid-3-sulfonimide; 1 wt % LiNO$_3$ | 671 | 667 | 578 | 456 |
| Embodiment 24 | C/S composite (Sulfur:Ketjen Black = 1:3) | Lithium sheet | DOL:DME = 1:1 | 1M lithium bistrifluoromethane-sulfonimide + 0.2M lithium 1,1,2,2,3,3-hexafluoropropane-1,3-disulfonimide | 708 | 740 | 416 | 359 |
| Embodiment 25 | Nano silicon | Lithium sheet | DOL:DME = 1:1 | 1M lithium 1,1,2,2,3,3-hexafluoropropane-1,3-disulfonimide; 1 wt % LiNO$_3$ | 2904 | 2812 | 2750 | 2051 |
| Comparative example 1 | C/S composite (Sulfur:Ketjen Black = 1:3) | Lithium sheet | DOL:DME = 1:1 | 1M lithium bistrifluoromethane-sulfonimide; 1 wt % LiNO$_3$ | 690 | 642 | 463 | 330 |
| Comparative example 2 | C/S composite (Sulfur:Ketjen Black = 1:3) | Sodium sheet | DOL:DME = 1:1 | 1M sodium bistrifluoromethane-sulfonimide | 534 | 522 | 463 | 151 |
| Comparative example 3 | C/S composite (Sulfur:Ketjen Black = 1:3) | Potassium sheet | DOL:DME = 1:1 | 1M potassium bistrifluoromethane-sulfonimide | 476 | 454 | 307 | 214 |
| Comparative example 4 | Nano silicon | Lithium sheet | DOL:DME = 1:1 | 1M lithium bistrifluoromethane-sulfonimide; 1 wt % LiNO$_3$ | 2800 | 2670 | 2514 | 1798 |
| Comparative example 5 | C/S composite (Sulfur:Ketjen Black = 1:3) | Lithium sheet | DOL:DME = 1:1 | 1.2M lithium bistrifluoromethane-sulfonimide; 1 wt % LiNO$_3$ | 704 | 675 | 589 | 412 |
| Comparative example 6 | C/S composite (Sulfur:Ketjen Black = 1:3) | Lithium sheet | DOL:DME = 1:1 | 1.3M lithium bistrifluoromethane-sulfonimide; 1 wt % LiNO$_3$ | 703 | 679 | 576 | 403 |
| Comparative example 7 | C/S composite (Sulfur:Ketjen Black = 1:3) | Lithium sheet | DOL:DME = 1:1 | 1.4M lithium bistrifluoromethane-sulfonimide; 1 wt % LiNO$_3$ | 689 | 676 | 571 | 394 |
| Comparative example 8 | C/S composite (Sulfur:Ketjen Black = 1:3) | Lithium sheet | EC:DME = 1:1 | 1M lithium bistrifluoromethane-sulfonimide; 1 wt % LiNO$_3$ | 695 | 670 | 510 | 428 |
| Comparative example 9 | C/S composite (Sulfur:Ketjen Black = 1:3) | Lithium sheet | FEC:DOL = 1:1 | 1M lithium bistrifluoromethane-sulfonimide; 1 wt % LiNO$_3$ | 699 | 649 | 529 | 429 |
| Comparative example 10 | C/S composite (Sulfur:Ketjen Black = 1:3) | Lithium sheet | FEC:DME = 1:1 | 1M lithium bistrifluoromethane-sulfonimide; 1 wt % LiNO$_3$ | 678 | 660 | 595 | 421 |
| Comparative example 11 | C/S composite (Sulfur:Ketjen Black = 1:3) | Lithium sheet | VC:DME = 1:1 | 1M lithium bistrifluoromethane-sulfonimide; 1 wt % LiNO$_3$ | 675 | 650 | 578 | 432 |
| Comparative example 12 | C/S composite (Sulfur:Ketjen Black = 1:3) | Lithium sheet | PC:DME = 1:1 | 1M lithium bistrifluoromethane-sulfonimide; 1 wt % LiNO$_3$ | 657 | 645 | 548 | 391 |
| Comparative example 13 | C/S composite (Sulfur:Ketjen Black = 1:3) | Lithium sheet | DEC:DME = 1:1 | 1M lithium bistrifluoromethane-sulfonimide; 1 wt % LiNO$_3$ | 667 | 646 | 516 | 331 |
| Comparative example 14 | C/S composite (Sulfur:Ketjen Black = 1:3) | Lithium sheet | EMC:DME = 1:1 | 1M lithium bistrifluoromethane-sulfonimide; 1 wt % LiNO$_3$ | 677 | 645 | 508 | 323 |
| Comparative example 15 | C/S composite (Sulfur:Ketjen Black = 1:3) | Lithium sheet | PS:DME = 1:1 | 1M lithium bistrifluoromethane-sulfonimide; 1 wt % LiNO$_3$ | 669 | 651 | 504 | 312 |

TABLE 1-continued

| Sample | Positive electrode material | Negative electrode material | Electrolyte solvent | Electrolyte additive | Battery capacity corresponding to cycle number (mAhg$^{-1}$) | | | |
|---|---|---|---|---|---|---|---|---|
| | | | | | 1 | 10 | 100 | 500 |
| Comparative example 16 | C/S composite (Sulfur:Ketjen Black = 1:3) | Lithium sheet | PA:DME = 1:1 | 1M lithium bistrifluoromethane-sulfonimide; 1 wt % LiNO$_3$ | 674 | 660 | 510 | 308 |
| Comparative example 17 | C/S composite (Sulfur:Ketjen Black = 1:3) | Lithium sheet | DOL:DME = 1:1 | 1M lithium bistrifluoromethane-sulfonimide | 701 | 562 | 363 | 164 |

It can be seen from the test results in Table 1 that compared with other existing metal-sulfur batteries, the metal-sulfur battery provided by the present disclosure shows better cycle performance, can effectively inhibit the formation of metal dendrites, and reduce the capacity loss during the charging and discharging process of the battery.

5. Test the electrochemical cycle stability of the batteries prepared by Embodiments 26-28 and Comparative examples 18-20 using Xinwei battery testing system. The main test contents include the detection of coulombic efficiency, interface impedance EIS and charge-discharge curve of the lithium sheet half battery, and the test results are shown in FIG. 6~FIG. 13.

Figure 9:
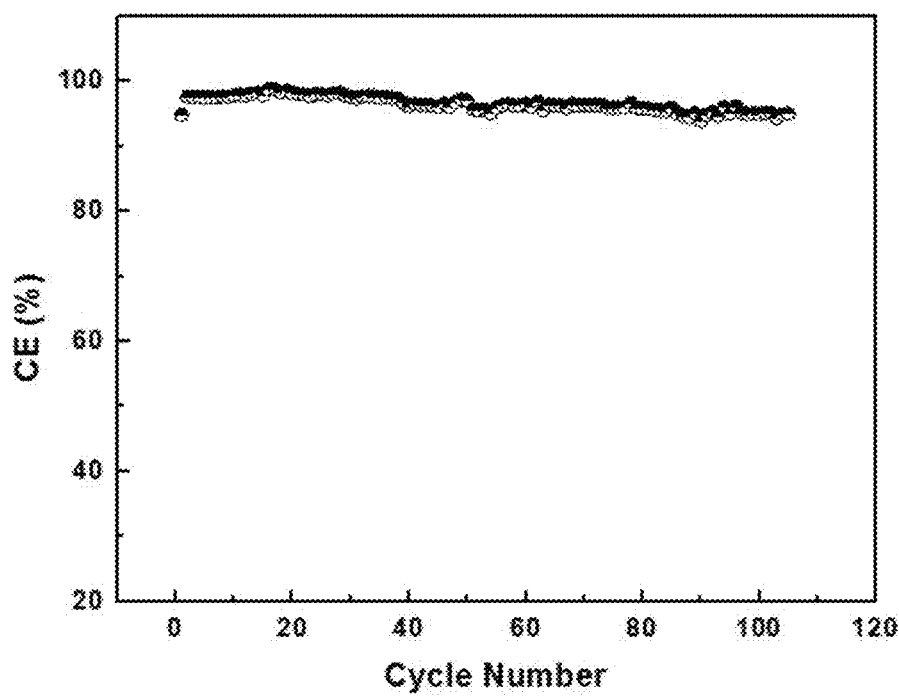
FIG. 9 is a cycle curve of coulombic efficiency of the half battery provided by Embodiment 26 of the present disclosure.
Figure 11:
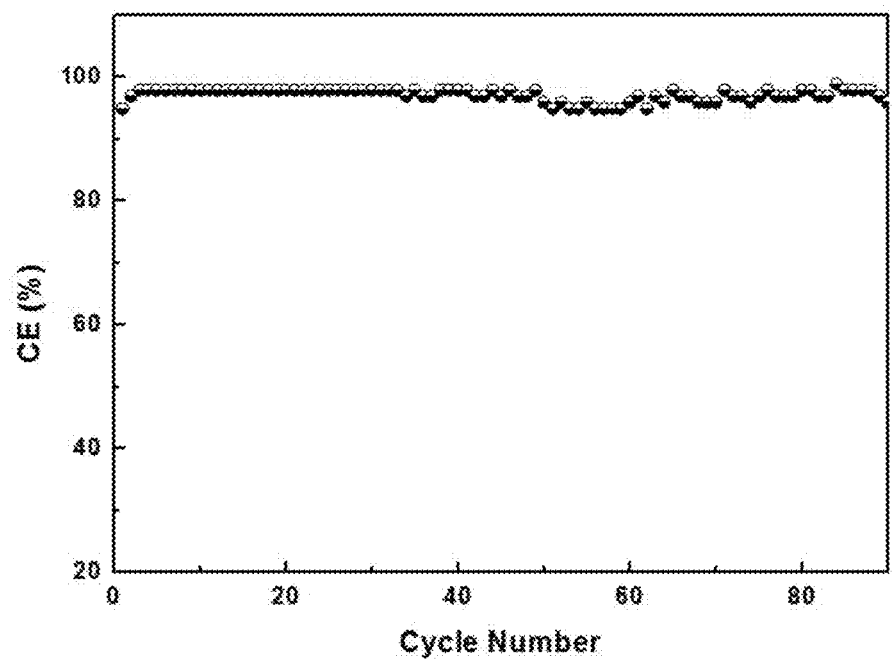
FIG. 11 is a cycle curve of coulombic efficiency of the half battery provided by Embodiment 27 of the present disclosure.
Figure 13:
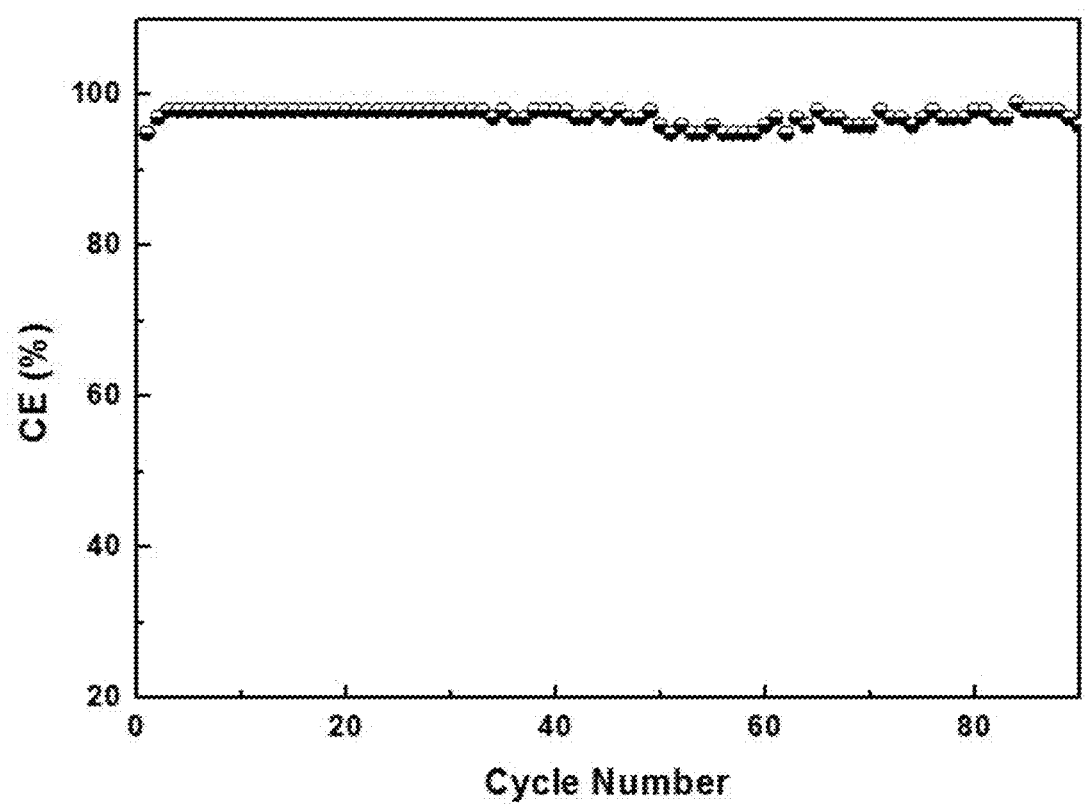
FIG. 13 is a cycle curve of coulombic efficiency of the half battery provided by Embodiment 28 of the present disclosure.

It can be seen from FIG. 9, FIG. 11 and FIG. 13 that the electrolyte provided by the present disclosure can effectively inhibit the generation of lithium dendrites and the amount of dead lithium, and the coulombic efficiency is still greater than 96% after more than 100 cycles.

Figure 6:
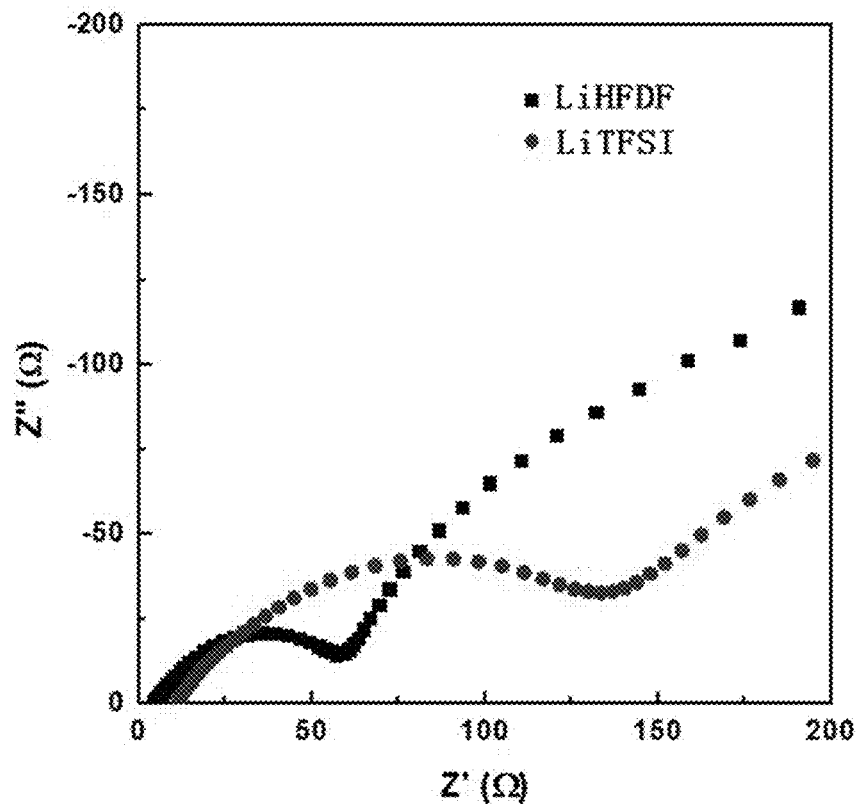
FIG. 6 is a comparative diagram of the interface impedance of the lithium metal of the half batteries provided by Embodiment 26 and Comparative example 18 of the present disclosure.
Figure 10:
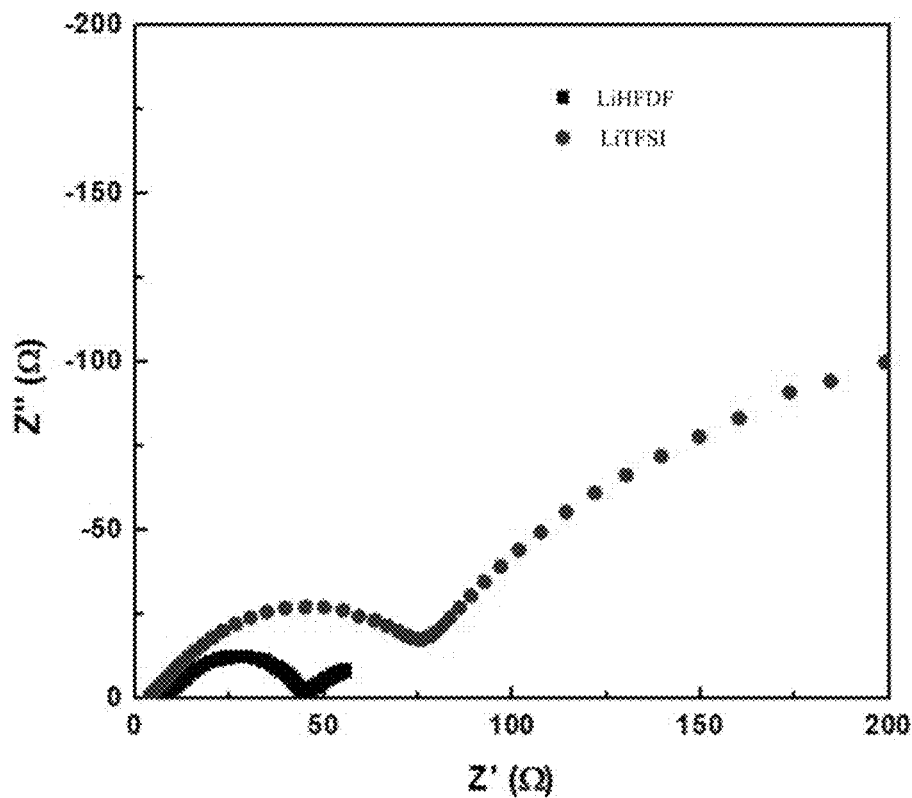
FIG. 10 is a comparative diagram of the interface impedance of the lithium metal of the half batteries provided by Embodiment 27 and Comparative example 19 of the present disclosure.
Figure 12:
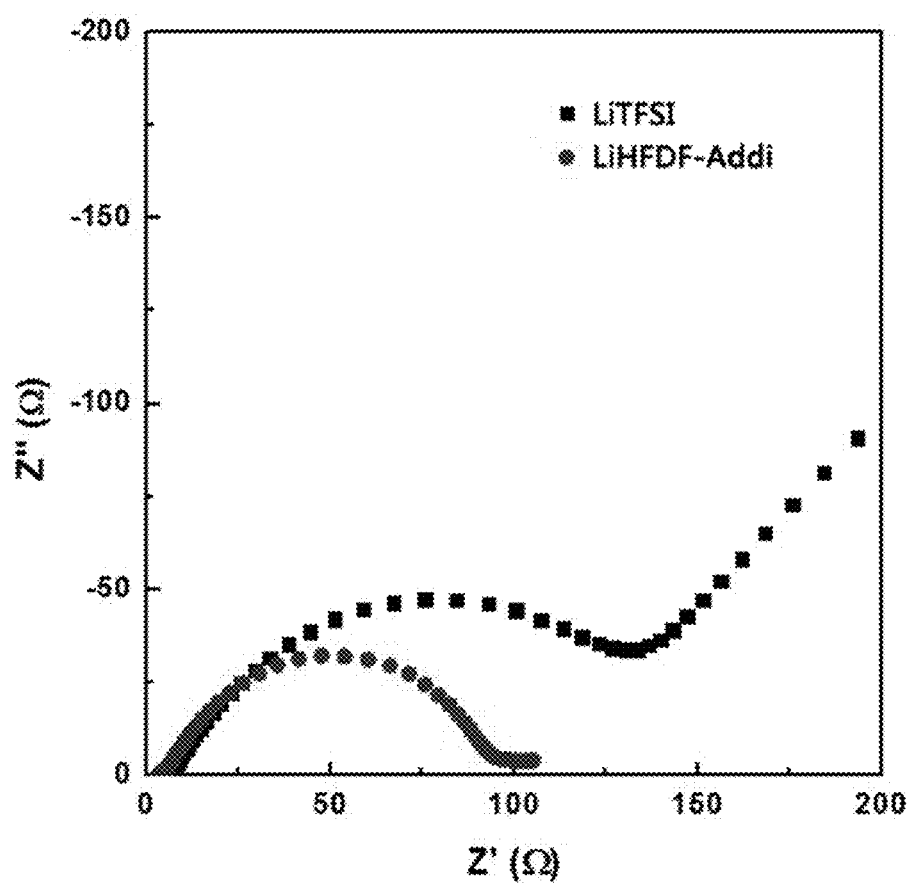
FIG. 12 is a comparative diagram of the interface impedance of the lithium metal of the half batteries provided by Embodiment 28 and Comparative example 20 of the present disclosure.

It can be seen from FIG. 6, FIG. 10 and FIG. 12 that the electrochemical impedance of the battery provided by the present disclosure is relatively low, and the interfacial impedance is small, which is mainly due to the fact that its electrolyte effectively inhibits the generation of lithium dendrites and dead lithium. In the comparative example, the interfacial impedance of LiTFSI electrolyte is relatively large, which is mainly due to the generation of a large number of lithium dendrites or dead lithium, resulting in an increase in the number of interfaces and an increase in the interfacial impedance.

Figure 7:
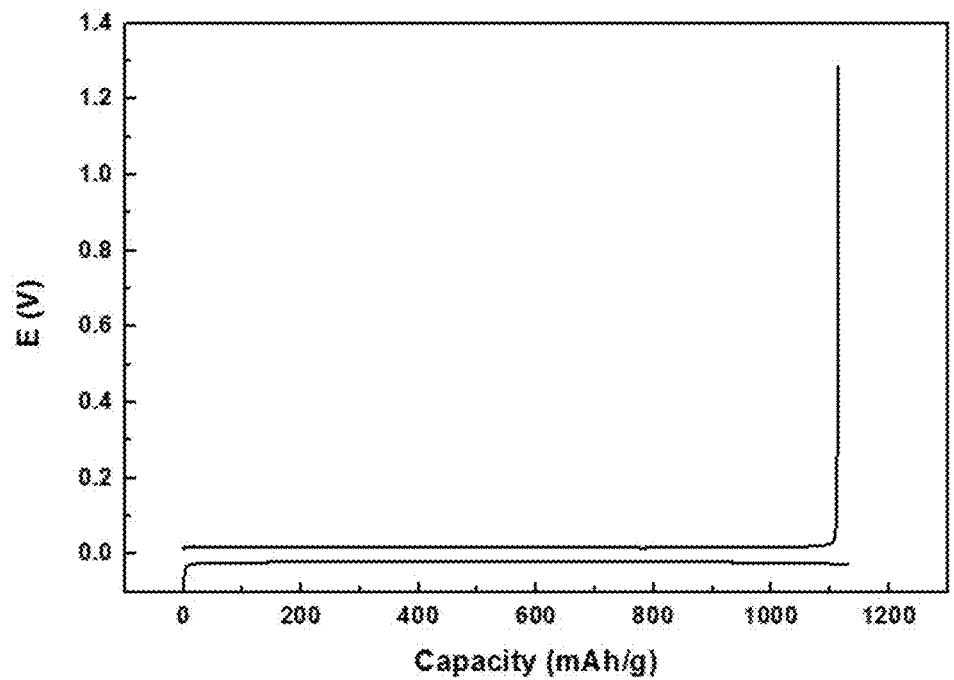
FIG. 7 is a charge-discharge curve of the lithium metal of the half batteries provided by Embodiment 26 and Comparative example 18 of the present disclosure.
Figure 8:
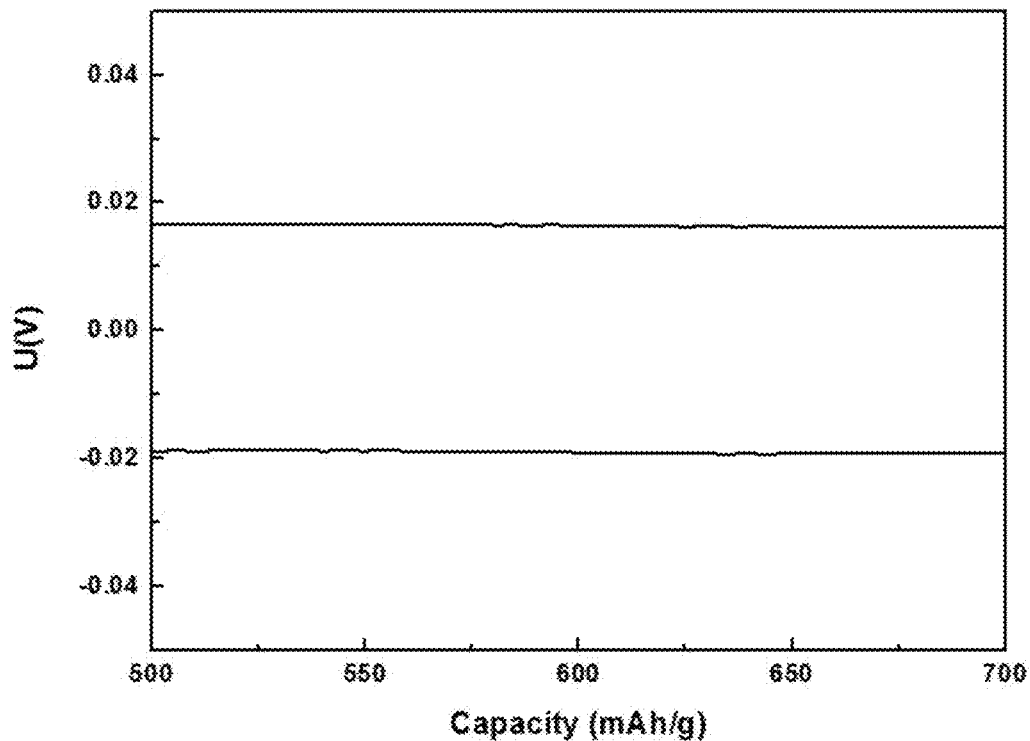
FIG. 8 is a partial enlarged view of FIG. 7.

It can be seen from FIG. 7 and FIG. 8 that the polarization voltage of the battery provided by the present disclosure is small during charging and discharging, which can directly prove that the electrolyte provided by the present disclosure has an unexpected effect in inhibiting the formation of lithium dendrites.

Embodiments 29~-36

Embodiments 29~-36 are used to illustrate the metal-sulfur battery and its preparation method disclosed in the present application, it was the same as Embodiment 1 except that:

the adopted positive electrode material, negative electrode material, electrolyte solvent and electrolyte additive are shown in Embodiments 29-36 of Table 2.

Comparative Examples 21~-24

Comparative examples 21~-24 are used to contrastively illustrate the metal-sulfur battery and its preparation method disclosed in the present application, it includes most of the steps of Embodiment 1, with the following differences:

the adopted positive electrode material, negative electrode material, electrolyte solvent and electrolyte additive are shown in Comparative example 21~-24 of Table 2.

TABLE 2

| Sample | Positive electrode material | Negative electrode material | Electrolyte solvent | Electrolyte additive |
|---|---|---|---|---|
| Embodiment 1 | C/S composite (Sulfur:Ketjen Black = 1:3) | Lithium sheet | DOL:DME = 1:1 | 1M lithium 1,1,2,2,3,3-hexafluoropropane-1,3-disulfonimide; 1 wt % LiNO$_3$ |
| Embodiment 29 | C/S composite (Sulfur:Ketjen Black = 1:3) | Sodium sheet | DOL:DME = 1:1 | 1M sodium 1,1,2,2,3,3-hexafluoropropane-1,3-disulfonimide |
| Embodiment 30 | C/S composite (Sulfur:Ketjen Black = 1:3) | Potassium sheet | DOL:DME = 1:1 | 1M potassium 1,1,2,2,3,3-hexafluoropropane-1,3-disulfonimide |
| Embodiment 31 | C/S composite (Sulfur:Ketjen Black = 1:3) | Lithium sheet | FEC:DOL = 1:1 | 1M lithium 1,1,2,2,3,3-hexafluoropropane-1,3-disulfonimide; 1 wt % LiNO$_3$ |
| Embodiment 32 | C/S composite (Sulfur:Ketjen Black = 1:3) | Lithium sheet | DOL:DME = 1:1 | 1M lithium 1,1-difluoromethane-disulfonimide; 1 wt % LiNO$_3$ |
| Embodiment 33 | C/S composite (Sulfur:Ketjen Black = 1:3) | Lithium sheet | DOL:DME = 1:1 | 1M lithium 1,1,2,2,3,3-hexafluoropropane-1,3-dicarboxyimide; 1 wt % LiNO$_3$ |

TABLE 2-continued

| Sample | Positive electrode material | Negative electrode material | Electrolyte solvent | Electrolyte additive |
|---|---|---|---|---|
| Embodiment 34 | C/S composite (Sulfur:Ketjen Black = 1:3) | Lithium sheet | DOL:DME = 1:1 | 1M lithium 1,2,3,3-tetrafluoro-1-propene-1,3-disulfonimide |
| Embodiment 35 | C/S composite (Sulfur:Ketjen Black = 1:3) | Lithium sheet | DOL:DME = 1:1 | 1M lithium 1,1,2,2,3,3-hexafluoropropane-1-carboxylic acid-3-sulfonimide; 1 wt % LiNO$_3$ |
| Embodiment 36 | C/S composite (Sulfur:Ketjen Black = 1:3) | Lithium sheet | DOL:DME = 1:1 | 1M lithium bistrifluoromethane-sulfonimide + 0.2M lithium 1,1,2,2,3,3-hexafluoropropane-1,3-disulfonimide |
| Comparative example 1 | C/S composite (Sulfur:Ketjen Black = 1:3) | Lithium sheet | DOL:DME = 1:1 | 1M lithium bistrifluoromethane-sulfonimide; 1 wt % LiNO$_3$ |
| Comparative example 21 | C/S composite (Sulfur:Ketjen Black = 1:3) | Sodium sheet | DOL:DME = 1:1 | 1M sodium bistrifluoromethane-sulfonimide |
| Comparative example 22 | C/S composite (Sulfur:Ketjen Black = 1:3) | Potassium sheet | DOL:DME = 1:1 | 1M potassium bistrifluoromethane-sulfonimide |
| Comparative example 23 | C/S composite (Sulfur:Ketjen Black = 1:3) | Lithium sheet | FEC:DME = 1:1 | 1M lithium bistrifluoromethane-sulfonimide; 1 wt % LiNO$_3$ |
| Comparative example 24 | C/S composite (Sulfur:Ketjen Black = 1:3) | Lithium sheet | PA:DME = 1:1 | 1M lithium bistrifluoromethane-sulfonimide; 1 wt % LiNO$_3$ |

Performance Test

Figure 14:
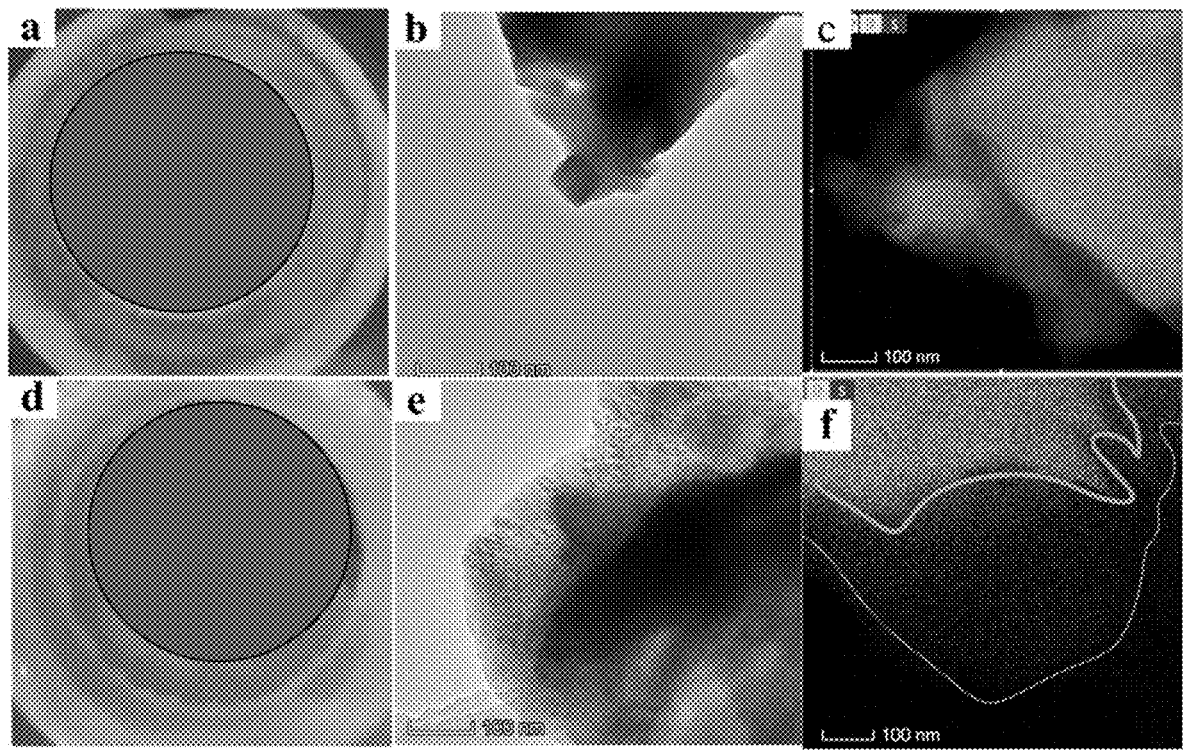
FIG. 14 shows pictures of the electrode pole piece, TEM and EDX of the metal-sulfur batteries with different electrolytes provided by Embodiment 1 and Comparative example 1 of the present disclosure after being charged and discharged for 5 times.

1. After the metal-sulfur batteries prepared by Embodiment 1 and Comparative example 1 were cycled for 5 times, the batteries were disassembled, and the pictures of battery pole piece and TEM and EDX of the battery materials were extracted and shown in FIG. 14. Pictures a, b and c in the upper half of FIG. 14 are the pictures of the battery pole piece, TEM and EDX of the battery materials of the metal-sulfur battery provided by Embodiment 1; Pictures d, e and f in the lower half of FIG. 14 are the pictures of the battery pole piece, TEM and EDX of the battery materials of the metal-sulfur battery provided by Comparative example 1.

It can be seen by comparing the pictures in FIG. 14 that the electrolyte provided by the present disclosure was used in the battery of Embodiment 1, and the sulfur on the separator of the battery was obviously less than that of using LiTFSI electrolyte after five cycles of charging and discharging. The above indicates that the electrolyte provided by the present disclosure can inhibit the dissolution of sulfur during the charging and discharging process. It can be seen from the picture of TEM that a thick SEI film was formed on the surface of the battery material by using the electrolyte provided by the present disclosure, and it can be seen from the picture of EDX that this SEI film was mainly composed of chemical substances containing F.

Figure 15:
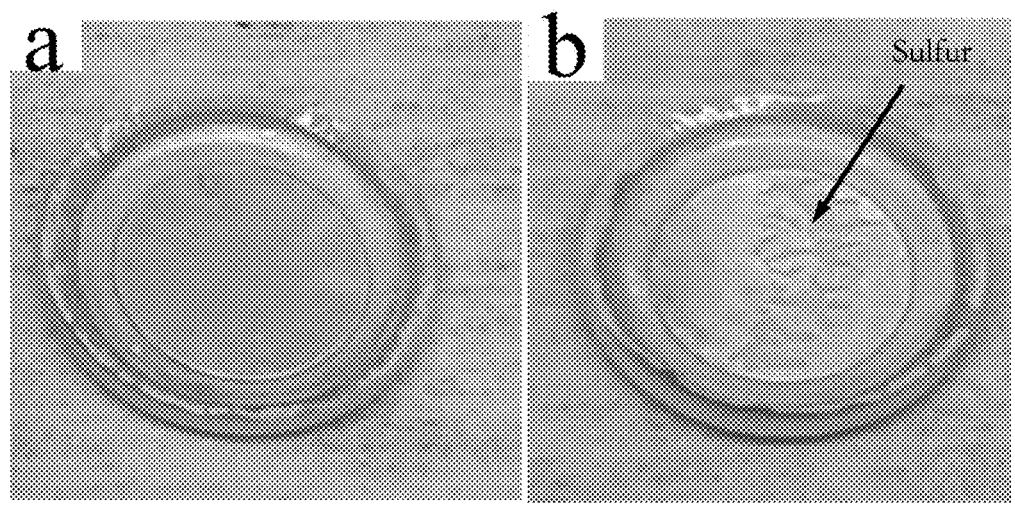
FIG. 15 shows pictures of the separators of the metal-sulfur batteries with different electrolytes provided by Embodiment 29 and Comparative example 21 of the present disclosure after being charged and discharged for 5 times.

2. The test results of Embodiment 29 and Comparative example 21 are shown in FIG. 15. Picture a shows the sulfur dissolution of Embodiment 29 after five cycles, and picture b shows the sulfur dissolution of Comparative example 21 after five cycles. It can be seen from the pictures that the sulfur content on the separator using cyclic sodium 1,1,2,2,3,3-hexafluoropropane-1,3-disulfonimide is obviously less than that on the separator using noncyclic sodium bis(trifluoromethylsulfonyl) amino, which indicates that cyclic sodium 1,1,2,2,3,3-hexafluoropropane-1,3-disulfonimide can inhibit the dissolution of sulfur.

Figure 16:
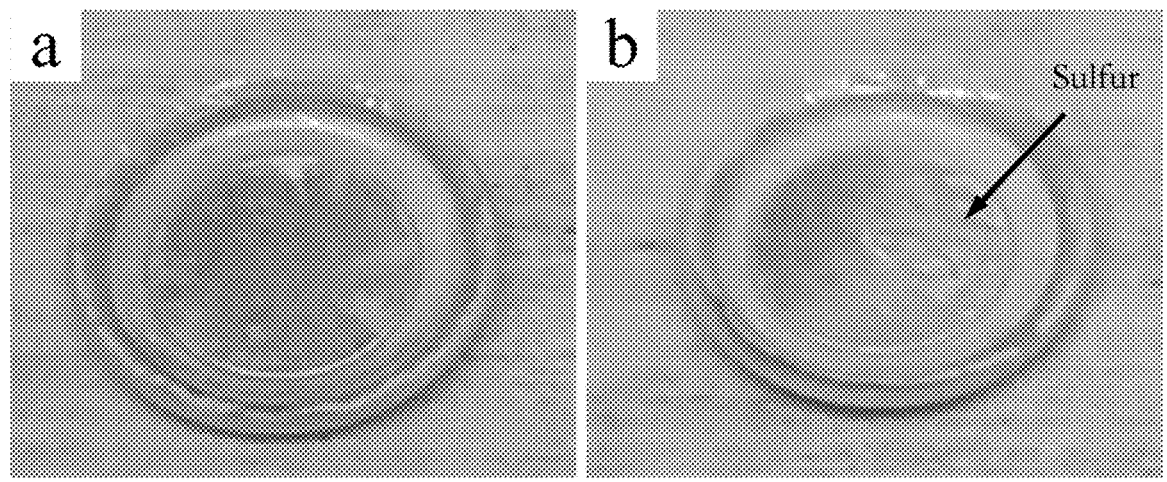
FIG. 16 shows pictures of the separators of the metal-sulfur batteries with different electrolytes provided by Embodiment 30 and Comparative example 22 of the present disclosure after being charged and discharged for 5 times.

3. The test results of Embodiment 30 and Comparative example 22 are shown in FIG. 16. Picture a shows the sulfur dissolution of Embodiment 30 after five cycles, and picture b shows the sulfur dissolution of Comparative example 22 after five cycles. It can be seen from the pictures that the sulfur content of the separator using cyclic potassium 1,1,2,2,3,3-hexafluoropropane-1,3-disulfonimide is obviously less than that of the separator using noncyclic potassium bistrifluoromethanesulfonimide, which indicates that cyclic potassium 1,1,2,2,3,3-hexafluoropropane-1,3-disulfonimide can inhibit the dissolution of sulfur.

Figure 17:
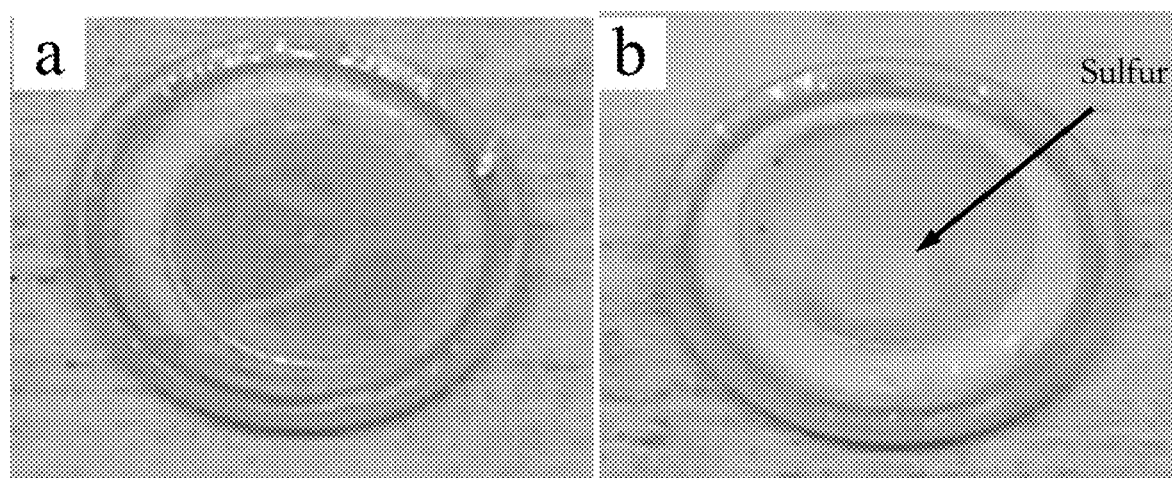
FIG. 17 shows pictures of the separators of the metal-sulfur batteries with different electrolytes provided by Embodiment 31 and Comparative example 23 of the present disclosure after being charged and discharged for 5 times.

4. The test results of Embodiment 31 and Comparative example 23 are shown in FIG. 17. Picture a shows the sulfur dissolution of Embodiment 31 after five cycles, and picture b shows the sulfur dissolution of Comparative example 23 after five cycles. It can be seen from the pictures that, in the solvent of FEC:DME=1:1, the sulfur content on the separator using cyclic lithium 1,1,2,2,3,3-hexafluoropropane-1,3-disulfonimide is obviously less than that on the separator using noncyclic lithium bistrifluoromethanesulfonimide, which indicates that cyclic lithium 1,1,2,2,3,3-hexafluoropropane-1,3-disulfonimide can also inhibit the dissolution of sulfur in the fluorinated solvent.

Figure 18:
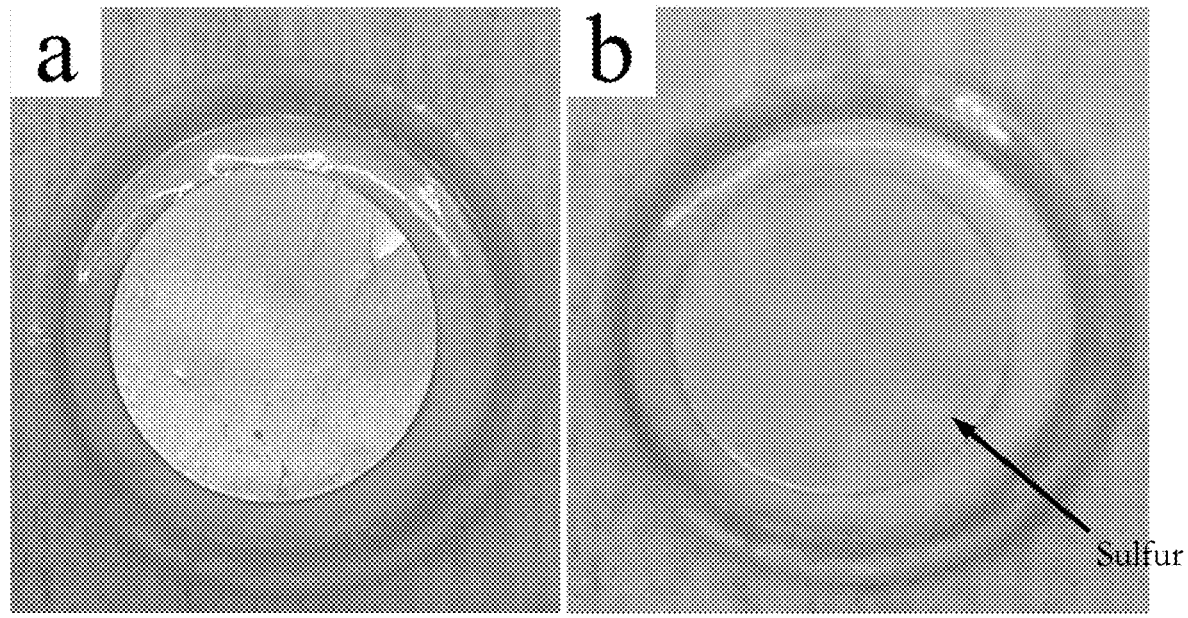
FIG. 18 shows pictures of the separators of the metal-sulfur batteries with different electrolytes provided by Embodiment 32 and Comparative example 24 of the present disclosure after being charged and discharged for 5 times.

5. The test results of Embodiment 32 and Comparative example 24 are shown in FIG. 18. Picture a shows the sulfur dissolution of Embodiment 32 after five cycles, and picture b shows the sulfur dissolution of Comparative example 24 after five cycles. It can be seen from the pictures that, in the solvent of DOL:DME=1:1, the sulfur content on the separator using 1M cyclic lithium 1,1-difluoromethane-disulfonimide is obviously less than that on the separator using noncyclic lithium bistrifluoromethanesulfonimide, which indicates that other cyclic lithium sulfonimide can also inhibit the dissolution of sulfur.

Figure 19:
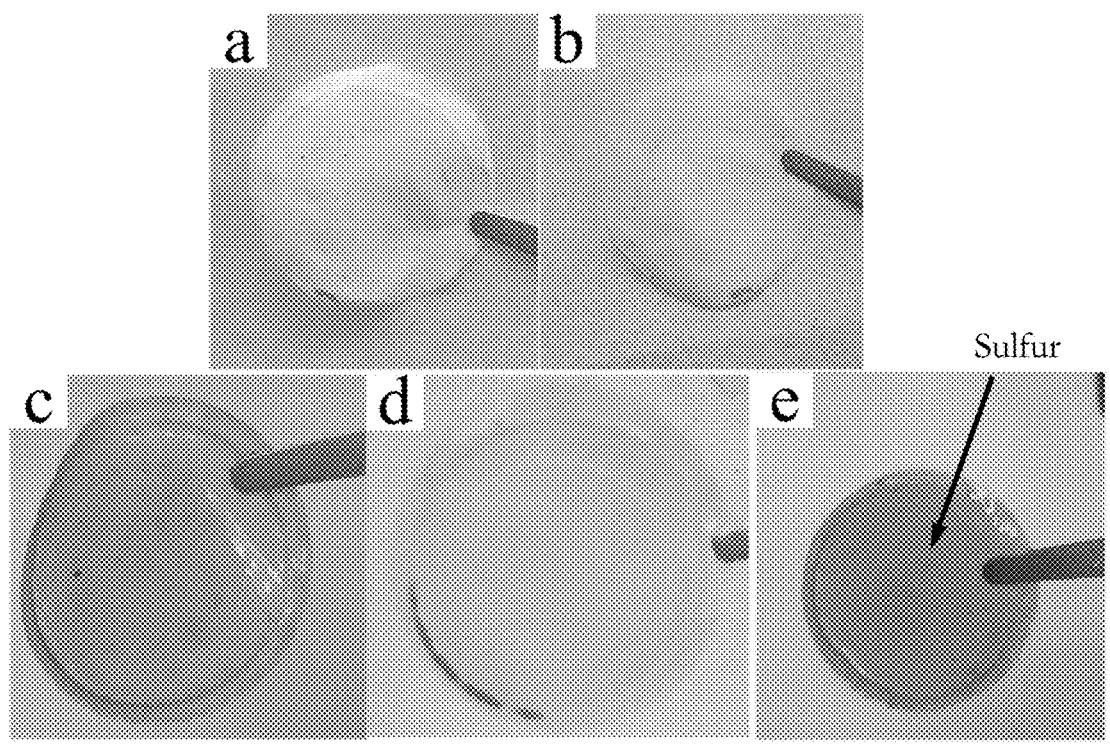
FIG. 19 shows pictures of the separators of the metal-sulfur batteries with different electrolytes provided by Embodiment 33-36 and Comparative example 1 of the present disclosure after being charged and discharged for 5 times.

6. FIG. 19 are pictures of sulfur dissolution on the battery separators of Embodiments 33-36 (pictures a-d in FIG. 19) and Comparative example 1 (picture e in FIG. 19) after five cycles. It can be seen from the pictures that using cyclic lithium carbodiimide, unsaturated lithium sulfonimide, and cyclic lithium imide containing carboxyacyl and sulfonyl as lithium salt for electrolyte, and using lithium 1,1,2,2,3,3-hexafluoropropane-1,3-disulfonimide as additive for electrolyte can both inhibit the dissolution of sulfur.

The above are only preferred embodiments of the present disclosure, and not intended to limit the present disclosure. Any modifications, equivalent substitutions and improvements made within the spirit and principles of the present disclosure shall be included in the protection scope of the present disclosure.

The invention claimed is:

1. A metal-sulfur battery, comprising a positive electrode material, a negative electrode material and an electrolyte, the positive electrode material comprises one of elemental sulfur or S-based compound; the electrolyte comprises a solvent and an electrolyte salt; and the electrolyte salt comprises one or more salts represented by structural formulas 1-3:

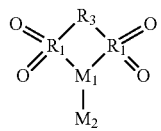

Structural formula 1

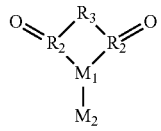

Structural formula 2

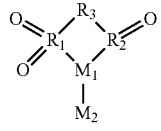

Structural formula 3 wherein, $R_1$ is selected from S or Se; $R_2$ is selected from C, Si, Ge or Sn; $M_1$ is selected from N, B, P, As, Sb or Bi; $M_2$ is selected from Li, Na, K, Ru, Cs, Fr, Al, Mg, Zn, Be, Ca, Sr, Ba or Ra; $R_3$ is selected from an unsaturated carbon chain containing 1-4 carbons with part or all of hydrogen substituted by a halogen element or a halogenated hydrocarbyl group.

2. The metal-sulfur battery of claim 1, wherein the content of the electrolyte salt is 0.01M~10M.

3. The metal-sulfur battery of claim 1, wherein the electrolyte salt comprises one or more of the following compounds:

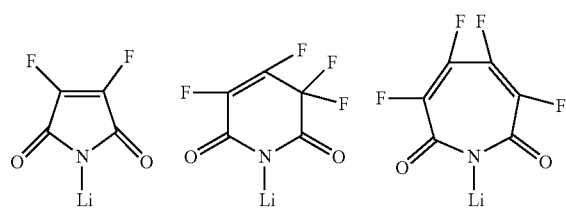

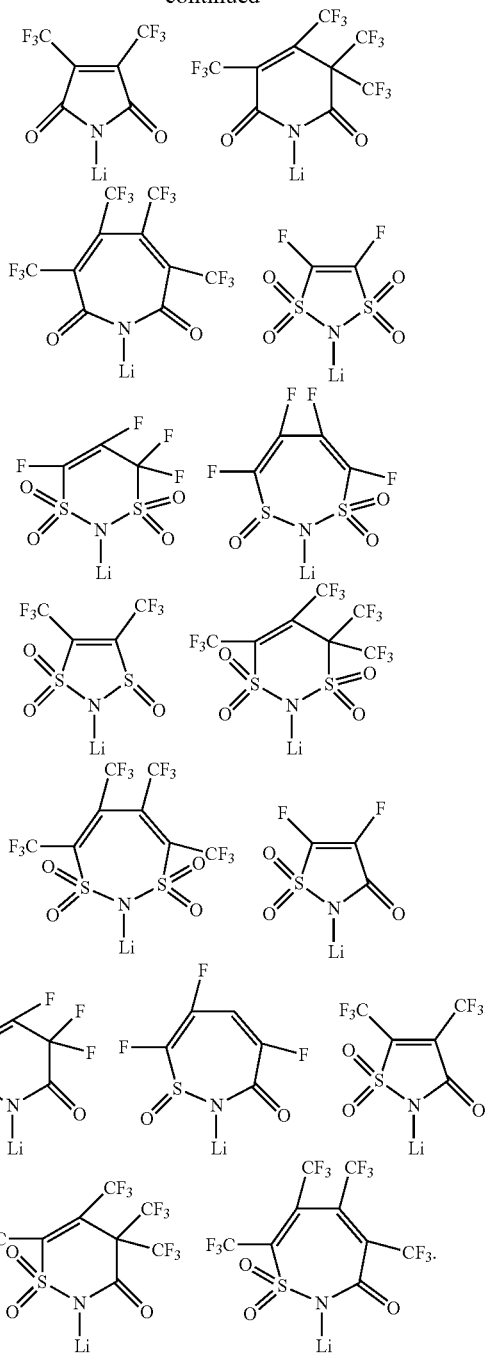

4. The metal-sulfur battery of claim 1, wherein the positive electrode material is a sulfur/carbon composite.

5. The metal-sulfur battery of claim 1, wherein the positive electrode material is a ketjen black/sulfur composite.

6. The metal-sulfur battery of claim 1, wherein the electrolyte further comprises a nitrate, and a mass percentage of the nitrate is 0.1%-5% based on the mass of the electrolyte being 100%.

7. The metal-sulfur battery of claim 1, wherein the negative electrode material comprises one or more of elemental lithium, elemental sodium, elemental potassium, elemental aluminum or elemental magnesium.

8. The metal-sulfur battery of claim 1, further comprising a separator interposed between the positive electrode material and the negative electrode material.

9. The metal-sulfur battery of claim 1, wherein the metal-sulfur battery is a lithium-sulfur battery.

10. The metal-sulfur battery of claim 1, wherein the solvent is selected from one or more of a fluorinated solvent, ethylene glycol dimethyl ether, 1,3-dioxolane, propylene sulfite or methyl propionate.

11. The metal-sulfur battery of claim 10, wherein the fluorinated solvent comprises one or more of fluoroethylene carbonate, 3,3,3-fluoroethyl methyl carbonate or 1,1,2,2-tetrafluoroethyl-2',2',2'-trifluoroethyl ether.

12. The metal-sulfur battery of claim 1, wherein the electrolyte salt further comprises one or more of $LiPF_6$, $LiBF_4$, LiBOB, $LiClO_4$, $LiCF_3SO_3$, LiDFOB, $LiN(SO_2CF_3)_2$ or $LiN(SO_2F)_2$.

* * * * *